(12) United States Patent
Szymanski

(10) Patent No.: US 11,076,209 B2
(45) Date of Patent: Jul. 27, 2021

(54) REDUCED-COMPLEXITY INTEGRATED GUARANTEED-RATE OPTICAL PACKET SWITCH

(71) Applicant: Ted H. Szymanski, Toronto (CA)

(72) Inventor: Ted H. Szymanski, Toronto (CA)

( * ) Notice: Subject to any disclaimer, the term of this patent is extended or adjusted under 35 U.S.C. 154(b) by 0 days.

(21) Appl. No.: 16/796,298

(22) Filed: Feb. 20, 2020

(65) Prior Publication Data

US 2020/0196034 A1 Jun. 18, 2020

Related U.S. Application Data

(63) Continuation of application No. 15/766,730, filed as application No. PCT/CA2016/051182 on Oct. 7, 2016, now Pat. No. 10,687,128.

(Continued)

(51) Int. Cl.
*H04J 14/00* (2006.01)
*H04Q 11/00* (2006.01)
(Continued)

(52) U.S. Cl.
CPC ........ *H04Q 11/0005* (2013.01); *H04L 47/56* (2013.01); *H04L 47/621* (2013.01);
(Continued)

(58) Field of Classification Search
CPC .......................... H04Q 11/0005; H04L 47/56
See application file for complete search history.

(56) References Cited

U.S. PATENT DOCUMENTS 8,089,959 B2 1/2012 Szymanski
8,503,440 B2 8/2013 Szymanski
(Continued)

FOREIGN PATENT DOCUMENTS

EP 0901301 A2 10/1999

OTHER PUBLICATIONS

Parekh, "A Generalized Processor Sharing Approach to Flow Control in Integrated Services Networks: The Single-Node Case", IEEE/ACM Transactions on Networking, Jun. 1993, pp. 344 to 357, vol. 1—issue No. 3.
(Continued)

*Primary Examiner* — David C Payne
*Assistant Examiner* — Pranesh K Barua

(57) ABSTRACT

A reduced-complexity optical packet switch which can provide a deterministic guaranteed rate of service to individual traffic flows is described. The switch contains N input ports, M output ports and N*M Virtual Output Queues (VOQs). Packets are associated with a flow f, which arrive an input port and depart on an output port, according to a predetermined routing for the flow. These packets are buffered in a VOQ. The switch can be configured to store several deterministic periodic schedules, which can be managed by an SDN control-plane. A scheduling frame is defined as a set of F consecutive time-slots, where data can be transmitted over connections between input ports and output ports in each time-slot. Each input port can be assigned a first deterministic periodic transmission schedule, which determines which VOQ is selected to transmit, for every time-slot in the scheduling frame. Each input port can be assigned a second deterministic periodic schedule, which determines which traffic flow within a VOQ is selected to transmit. Each input port can be assigned a third deterministic periodic schedule, which specifies to which VOQ an arriving packet (if any) is destined, for each time-slot in a scheduling frame. Each input port can be assigned a fourth deterministic periodic schedule, which specifies to which Flow-VOQ within a VOQ an arriving packet (if any) is destined. In this manner, each traffic flow can receive a deterministic guaranteed-rate of transmission through the switch.

38 Claims, 13 Drawing Sheets

Related U.S. Application Data

(60) Provisional application No. 62/238,510, filed on Oct. 7, 2015.

(51) Int. Cl.
*H04L 12/863* (2013.01)
*H04L 12/935* (2013.01)
*H04L 12/875* (2013.01)

(52) U.S. Cl.
CPC ......... *H04L 49/30* (2013.01); *H04Q 11/0062* (2013.01); *H04Q 2011/0064* (2013.01)

(56) References Cited

U.S. PATENT DOCUMENTS

| | | | |
|---|---|---|---|
| 8,619,566 B2 | 12/2013 | Szymanski | |
| 8,665,722 B2* | 3/2014 | Szymanski | H04L 47/14 370/235 |
| 8,681,609 B2 | 3/2014 | Szymanski | |
| 2003/0123392 A1* | 7/2003 | Ruutu | H04L 49/9084 370/235 |
| 2003/0227901 A1* | 12/2003 | Kodialam | H04L 47/50 370/351 |
| 2007/0280261 A1* | 12/2007 | Szymanski | H04L 49/255 370/395.4 |
| 2011/0044174 A1* | 2/2011 | Szymanski | H04L 47/283 370/238 |
| 2011/0235509 A1 | 9/2011 | Szymanski | |
| 2013/0279340 A1 | 10/2013 | Nakash et al. | |
| 2014/0334821 A1 | 11/2014 | Mehrvar | |
| 2016/0301627 A1* | 10/2016 | Szymanski | H04L 47/528 |

OTHER PUBLICATIONS

Parekh, "A Generalized Processor Sharing Approach to Flow Control in Integrated Service Networks: The Multiple Node Case", IEEE/ACM Transactions on Networking, Apr. 1994, pp. 137 to 150, vol. 2—issue No. 2.

Keslassy, et al., "On Guaranteed Smooth Scheduling for Input-Queued Switches", IEEE/ACM Transactions on Networking, Dec. 2005, pp. 1364 to 1375, vol. 13—issue No. 6.

Iyer, et al., "Designing Packet Buffers for Router Linecards", IEEE/ACM Transactions on Networking, Jun. 2008, pp. 705 to 717, vol. 16—issue No. 3.

Szymanski, "A Low-Jitter Guaranteed Rate Scheduling Algorithm for Packet-Switched IP Routers", IEEE Transactions on Communications, Nov. 2009, pp. 3446 to 3459, vol. 57—issue No. 11.

Szymanski, "Supporting Consumer Services in a Deterministic Industrial Internet Core Network", IEEE Communications Magazine, Jun. 2016, pp. 110 to 117, vol. 54—issue No. 6.

Szymanski, "Securing the Industrial-Tactile Internet of Things with Deterministic Silicon Photonics Switches", IEEE Access Magazine, 2016, pp. 8236 to 8249, vol. 4.

Szymanski, "An Ultra Low Latency Guaranteed-Rate Internet for Cloud Services", IEEE/ACM Transactions on Networking, Feb. 2016, pp. 123 to 136, vol. 24—issue No. 1.

Deo, "Enabling Next-Generation Platforms Using Intel's 3-D System-in-Package Technology", White Paper, 2016, available at <https://www.intel.com/content/dam/www/programmable/us/en/pdfs/literature/wp/wp-01251-enabling-nextgen-with-3d-system-in-package.pdf>.

Bolla, et al., "Energy Efficiency in the Future Internet: A Survey of Existing Approaches and Trends in Energy-Aware Fixed Network Infrastructures", IEEE Communications Surveys & Tutorials, Second Quarter 2011, pp. 223 to 244, vol. 13—issue No. 2.

Kim, et al., "Improving Network Management with Software Defined Networking", IEEE Communications Magazine, Feb. 2013, pp. 114 to 119, vol. 51—issue No. 2.

Mckeown, "The iSLIP Scheduling Algorithm for Input Queued Switches", IEEE/ACM Transactions on Networking, Apr. 1999, pp. 188 to 201, vol. 7—issue No. 2.

Doany, et al., "Terabit/Sec VCSEL-Based 48-Channel Optical Module Based on Holey CMOS Transceiver IC.", IEEE Journal of Lightwave Technology, Feb. 15, 2013, pp. 672 to 680, vol. 31—issue No. 4.

Arakawa, et al., "Silicon Photonics for Next Generation System Integration Platform", IEEE Communications Magazine, Mar. 2013, pp. 72 to 77, vol. 51—issue No. 3.

Vlasov, "Silicon-CMOS Integrated Nano-Photonics for Computer and Data-Communications Beyond 100G", IEEE Communications Magazine, Feb. 2012, pp. S67 to S72.

Kuramochi et al., "Over 100 bit Integrated Optical RAM chip", NTT document, 2015.

Cisco Systems, "Cisco CRS Carrier Routing System Multishelf System Description", 2014, retrieved at (https://www.cisco.com/c/en/us/td/docs/iosxr/crs/hardware-install/crs-1/multishelf/system-description/b-crs-multishelf-sys-desc.html).

Yelik, et al., "The Magellan Report on Cloud Computing for Science", US Department of Energy, Office of Science, Office of Advanced Scientific Computing Research (ASCR), Dec. 2011.

International Search Report dated Jan. 9, 2017, for corresponding International Patent Application No. PCT/CA2016/051182.

Written Opinion dated Jan. 9, 2017, for corresponding International Patent Application No. PCT/CA2016/051182.

International Preliminary Report on Patentability (IPRP) dated Apr. 10, 2018, for corresponding International Patent Application No. PCT/CA2016/051182.

\* cited by examiner

Let s denote a switch in the range 1 <= s <= S.                                                                      500
Let every switch in a network have N input ports and M output ports.
Let j denote an input port in the range 1 <= j <= N.
Let k denote an output port in the range 1 <= k <= M.
Let G = the number of traffic flows (and traffic classes) in the system, which are numbered
from 1 to G. Let f denote a traffic flow (or traffic class) with range 1 <= f <= G.

502
Route every flow f along an end-to-end path of switches, from its source node to its
destination node. This step yields a matrix R, where element D(f,s) yields the output port over
which flow f departs in switch s, for 1 <= f <= G, and 1 <= s <= S. If a flow f does not pass
through a switch s, then set D(f,s) = 0. This step also yields a matrix A, where element A(f,s)
yields the input port over which flow f arrives in switch s.

For every switch s, determine its traffic rate matrix T, based on all flows which pass through
this switch. This step yields a 3D array T(j,k,s), where the element T(j,k,s) yields the
guaranteed rate of traffic between input port j and output port k in switch s, for 1 <= j <= N, 1
<= k <= M, and 1 <= s <= S. If a flow passes through s, it arrives at input port j = A(f,s), and
departs at output port D(f,s), and it therefore changes T(j,k,s).
                                                                                                                      504

For every switch s, determine a list of traffic flows which are transmitted on each output link k.
Let V be the number of flows which depart on outgoing link k in switch s. This step yields a list
of traffic flows, which is stored in a 3D array L(k,v,s). The element f = L(k,v,s) yields a traffic
flow f which departs on link k of switch s, for 1 <= k <= M, 1 <= v <= V, 1 <= s <= S.

506

For every switch s, schedule the traffic rate matrix T(:,:,s). This step will determine the
matchings of input ports to output ports in switch s, for every time-slot t in a scheduling frame.
This step yields a schedule C(j,t,s), where k=C(j,t,s) identifies the output port k that input port j
transmits to. This step also identifies the VOQ(j,k) for service, in each input port j, in each time-
slot t of a scheduling frame, for 1 <= j <= N, 1 <= t <= F, 1 <= s <= S. Each VOQ receives its
guaranteed rate of service, according to the schedule C.
                                                                                                                      508

For every switch s, schedule the traffic flows within each VOQ. For every time-slot t when a VOQ(j,k) receives service, determine which traffic flow within the VOQ receives service. This step yields a 3D array P(k,t,s), where f = P(j,t,s) yields the traffic flow f, if any, which receives service at input port j in time-slot t, for 1 <= j <= N, 1 <= t <= F, and 1 <= s <= S. If no flow receives service, then a 0 is entered into the array. This schedule P determines which flow, if any, is transmitted from a VOQ, in each time-slot.This step also yields a 3D array Q(k,t,s), where f = Q(k,t,s) yields the traffic flow f, if any, which will depart on output port k of switch s, in time-slot t, for 1 <= k <= M, 1 <= t <= F, and 1 <= s <= S. If no flow departs, then a 0 is entered into the array. This schedule Q determines which flow departs on each output link, in each time-slot For every switch s, and for every output link k, send the row Q(k,1:F,s) to the switch at the receiving end of the output link k.    512

For every switch s, and for every input port j, receive a row vector z(1,1:F), from the switch at the sending end of the link. Store this row vector z into a matrix Z(j,1:F) in switch s. f=Z(j,t) identifies the traffic flow f, if any, which arrives at this input port j at said switch s, for every time-slot in a scheduling frame, for 1 <= j <= N, 1 <= t <= F, 1 <= s <= S.    514

For every switch s, and for every input port j, compute a row vector y(1,1:F), where k=y(1,t) yields the output port k, if any, required by a traffic flow f, if any, which arrives on said input port j of switch s at time-slot t. Store this row vector y(1,1:F) into a matrix Y(j,1:F) at switch s. k=Y(j,t) identifies the output port k which an arriving packet on input port j of switch s at time-slot t requires (if any), for 1 <= j <= N, 1 <= t <= F, 1 <= s <= S. This matrix will elimiinate the need to process packet-headers in switch s.

802.3 Ethernet packet and frame structure

| Layer | Preamble | Start of frame delimiter | MAC destination | MAC source | 802.1Q tag (optional) | Ethertype (Ethernet II) or length (IEEE 802.3) | Payload | Frame check sequence (32-bit CRC) | Interpacket gap |
|---|---|---|---|---|---|---|---|---|---|
| | 7 octets | 1 octet | 6 octets | 6 octets | (4 octets) | 2 octets | 46(42)[b]–1500 octets | 4 octets | 12 octets |
| Layer 2 Ethernet frame | | ← 64–1518(1522) octets → | | | | | | | |
| Layer 1 Ethernet packet | | ← 72–1526(1530) octets → | | | | | | | |

FIG. 5A

IPv4 Header Format

| Offsets | Octet | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Version | | | | IHL | | | | DSCP | | | | | | ECN | | Total Length | | | | | | | | | | | | | | | |
| 4 | 32 | Identification | | | | | | | | | | | | | | | | Flags | | | Fragment Offset | | | | | | | | | | | | |
| 8 | 64 | Time To Live | | | | | | | | Protocol | | | | | | | | Header Checksum | | | | | | | | | | | | | | | |
| 12 | 96 | Source IP Address | | | | | | | | | | | | | | | | | | | | | | | | | | | | | | | |
| 16 | 128 | Destination IP Address | | | | | | | | | | | | | | | | | | | | | | | | | | | | | | | |
| 20 | 160 | Options (if IHL > 5) | | | | | | | | | | | | | | | | | | | | | | | | | | | | | | | |

FIG. 5B

Fixed header format

| Offsets | Octet | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Version | | | | Traffic Class | | | | | | | | Flow Label | | | | | | | | | | | | | | | | | | | |
| 4 | 32 | Payload Length | | | | | | | | | | | | | | | | Next Header | | | | | | | | Hop Limit | | | | | | | |
| 8 | 64 | Source Address | | | | | | | | | | | | | | | | | | | | | | | | | | | | | | | |
| 12 | 96 | | | | | | | | | | | | | | | | | | | | | | | | | | | | | | | | |
| 16 | 128 | | | | | | | | | | | | | | | | | | | | | | | | | | | | | | | | |
| 20 | 160 | | | | | | | | | | | | | | | | | | | | | | | | | | | | | | | | |
| 24 | 192 | Destination Address | | | | | | | | | | | | | | | | | | | | | | | | | | | | | | | |
| 28 | 224 | | | | | | | | | | | | | | | | | | | | | | | | | | | | | | | | |
| 32 | 256 | | | | | | | | | | | | | | | | | | | | | | | | | | | | | | | | |
| 36 | 288 | | | | | | | | | | | | | | | | | | | | | | | | | | | | | | | | |

FIG. 5C

FIGURE 5 Various Packet formats

| LABEL IN | LABEL OUT | OP-PORT | RATE | ACTION |
|---|---|---|---|---|
| 27 | 103 | 1 | 45 | 0 |
| 415 | 276 | 2 | 30 | 0 |
| 130 | 314 | 1 | 25 | 0 |
| 94 | 760 | 1 | 35 | 0 |

FIG. 9A

| LABEL IN | LABEL OUT | OP-PORT | RATE | ACTION |
|---|---|---|---|---|
| 27 | 103 | 1 | 45 | 1 |
| 415 | 276 | 2 | 30 | 0 |
| 130 | 103 | 1 | 25 | 1 |
| 94 | 103 | 1 | 35 | 1 |

FIG. 9B

| TIME-SLOT | LABEL IN | LABEL OUT | OP-PORT | RATE | ACTION |
|---|---|---|---|---|---|
| 1 | 27 | 103 | 1 | 45 | 1 |
| 2 | 0 | 0 | 0 | 0 | 0 |
| 3 | 415 | 103 | 1 | 25 | 1 |
| ... | | | | | |
| 512 | 130 | 103 | 1 | 45 | 1 |
| ... | | | | | |
| 1023 | 0 | 0 | 0 | 0 | 0 |
| 1024 | 94 | 103 | 1 | 35 | 1 |

FIG. 9C

REDUCED-COMPLEXITY INTEGRATED GUARANTEED-RATE OPTICAL PACKET SWITCH

CROSS-REFERENCE TO RELATED APPLICATIONS

This application is a continuation of U.S. patent application Ser. No. 15/766,730, which is a national filing of International Application No. PCT/CA2016/051182, filed on Oct. 7, 2016, entitled "A REDUCED-COMPLEXITY INTEGRATED GUARANTEED-RATE OPTICAL PACKET SWITCH", listing T. H. Szymanski as the inventor which claims benefits from U.S. Patent Application No. 62/238,510 filed Oct. 7, 2015, the contents of which are hereby incorporated herein by reference.

FIELD OF THE INVENTION

The present invention relates generally to communications networks, devices and methods, and more particularly to a method and hardware designs to dramatically reduce the complexity of optical packet switches and routers. The method and designs yields reduced-complexity Guaranteed-Rate packet-switches which can be integrated into a single integrated circuit package. These integrated switches offer reduced complexity, deterministic (or Guaranteed-Rate) service to traffic flows, exceptionally low latencies, 100% utilization and improved energy efficiency. The method and designs can be used to support the Internet Protocol (IP) IPv4 and IPv6 networks, ATM networks, MPLS networks, optical networks, and 4G and 5G wireless networks.

BACKGROUND OF THE INVENTION

Articles Incorporated by Reference

The following documents are hereby incorporated by reference. These documents may be referred to by their title or by their numeric value.

[1] A. K. Parekh and R. G. Gallager, "A Generalized Processor Sharing Approach to Flow Control in Integrated Service Networks: the Single Node Case", IEEE/ACM Trans. Networking, vol. 1, pp. 344-357, 1993.

[2] A. K. Parekh and R. G. Gallager, "A Generalized Processor Sharing Approach to Flow Control in Integrated Service Networks: the Multiple Node Case", IEEE/ACM Trans. Networking, vol. 2, no. 2, pp. 137-150, 1994.

[3] I. Keslassy, M. Kodialam, T. V. Lakshman and D. Stiliadis, "On Guaranteed Smooth Scheduling for Input-Queued Switches", IEEE/ACM Trans. Networking, Vol. 13, No. 6, December 2005.

[4] S. Iyer, R R. Kompella, N. Mckeown, "Designing Packet Buffers for Router Linecards", IEEE Trans. Networking, Vol. 16, No. 3, June 2008, pp. 705-717

[5] T. H. Szymanski, "A Low-Jitter Guaranteed Rate Scheduling Algorithm for Packet-Switched IP Routers", IEEE Trans. Communications, Vol. 57, No. 11, November 2009, pp. 3446-3450.

[6] T. H. Szymanski, "Supporting Consumer Services in a Deterministic Industrial Internet Core Network", IEEE Communications Magazine, Vol. 54.6, June 2016, pp. 110-117

[7] T. H. Szymanski, "Securing the Industrial-Tactile Internet of Things with Deterministic Silicon Photonics Switches", IEEE Access Magazine, September 2016.

[8] T. H. Szymanski, "An Ultra Low Latency Guaranteed-Rate Internet for Cloud Services", IEEE Trans. on Networking, Vol. 24, No. 1, February 2016, pp. 123-36.

[9] T. H. Szymanski, "Method and Apparatus to Schedule Packets Through a Crossbar Switch with Delay Guarantees", U.S. Pat. No. 8,089,959 B2, Jan. 3, 2012.

[10] T. H. Szymanski, "Method to Achieve Bounded Buffer Sizes and Quality of Service Guarantees in the Internet Network", U.S. Pat. No. 8,665,722, March 2014, pp. 1-45.

[11] T. H. Szymanski, "Delay and Jitter Limited Wireless Mesh Network Scheduling", U.S. Pat. No. 8,619,556 B2, Dec. 31, 2013.

[12] T. H. Szymanski, "Crossbar Switch and Recursive Scheduling", U.S. Pat. No. 8,503,440 B2, Aug. 6, 2013.

[13] T. H. Szymanski, entitled "Method to Schedule Multiple Traffic Flows Through Packet-Switched Routers with Near Minimal Queue Sizes", U.S. Pat. No. 8,681,609 B2, Mar. 25, 2014.

[14] Altera, "Enabling Next Generation Platforms using Altera's 3D Systems-in-Package Technology", White paper, 2016, (https://www.altera.com/content/dam/altera-www/global/en_US/pdfs/literature/wp/wp-01251-enabling-nextgen-with-3d-system-in-package.pdf)

[15] R. Bolla, R. Bruschi, F. Davoli, and F. Cucchietti, "Energy Efficiency in the Future Internet: A survey of existing approaches and trends in energy-aware fixed network infrastructures", IEEE Communications Surveys & Tutorials, Vol. 13, No. 2, May 2011, pp. 223-244.

[16] K. Yelik, S. Coghlan, B. Draney, R. S. Canon, "Mallegan Report on Cloud Computing for Science", US Dept. of Energy, Office of Science, December 2011,

[17] H. Kim and N. Feamster, "Improving Network Management with Software Defined Networking", IEEE Comm. Mag., Vol. 5, No. 2, 2013, pp. 114-119.

[18] N. McKeown, "The iSLIP Scheduling Algorithm for Input Queued Switches", IEEE Trans. Networking, Vol. 7, No. 2, April 1999, pp. 188-201

[19] F. E. Doany, G. L. Benjamin, M. K. Daniel, A. V. Rylyakov, C. Baks, C. Jahnes, F. Libsch, and C. L. Schow, "Terabit/Sec VCSEL-Based 48-Channel Optical Module Based on Holey CMOS Transceiver IC.", IEEE JLT, Vol. 31, no. 4, 2013, pp. 672-680.

[20] Y. Arakawa, N. Nakamura, Y. Urino, and T. Fujita., "Silicon Photonics for Next Generation System Integration Platform", IEEE Comm. Mag., Vol. 51, no. 3, 2013, pp. 72-77.

[21] Y. A. Vlasov, "Silicon-CMOS Integrated Nano-Photonics for Computer and Data-Communications Beyond 100G", IEEE Comm. Mag., February 2012

[22] E. Kuramochi et al, "Over 100 bit Integrated Optical RAM chip", NTT document, (http://www.ntt.co.jp/RD/active/201502/en/ct/pdf/R-2 e.pdf).

[23] Cisco Systems, "Cisco CRS Carrier Routing System Multishelf System Description", September 2015, pp. 1-4, (www.cisco.com)

There are several types of communications networks, including Internet Protocol (IP) networks, MPLS networks, Ethernet networks, Infiniband networks, and ATM networks. Switches are important components of these networks, and appear in 'Internet Protocol' (IP) routers, wireless routers, ATM and MPLS switches, data-center networks, computing systems and many other systems. A basic switch design allows several input ports to forward data to several output ports.

The Internet network carries 'Internet Protocol' (IP) packets. The Internet network currently supports 2 packet formats, IP version 4 and IP version 6, which are denoted IPv4 and IPv6 respectively. IPv4 packets typically vary in size from 64 bytes up to a maximum of about 1500 bytes. IPv6 packets can contain up to 64 Kbytes (or more). IP packets are typically buffered in the routers or switches of an Internet network, and the amount of buffers required in a typical router or switch can be very large. Often, thousands or millions of packets can be buffered in one IP router or switch. The switches used in routers are typically organized into one of three basic queuing schemes; switches which use Input Queues (IQs), switches which use Output Queues (OQs), and switches which use Crosspoint Queues (XQs). Combinations of these basic queuing schemes are also used.

IQ switches typically place buffers at the input side of the switch. A complex scheduler is used to schedule the transmission of packets from the input side to the output side, while avoiding collisions of packets at the output side (a collision occurs when two packets arrive at one output port simultaneously). An OQ switch places the buffers at the output side of the switch. If multiple packets arrive simultaneously to the same output port, then the switch must have an internal 'speedup' to be able to deliver these multiple packets to one output queue simultaneously. The speedup requirement increases the cost of the OQ switch. Large OQ switches are considered impractical.

A Crosspoint Queued (XQ) switch places the buffers, called crosspoint buffers, within the switching matrix, between the input and output sides of the switch. Each crosspoint buffer typically stores packets which originate at one input port and which are directed to one output port. XQ switches are easier to schedule than IQ switches, and they do not have the speedup requirement of OQ switches.

Combinations of these basic buffering schemes are possible, for example switches can use 'Combined Input and Output Queues' (CIOQ), switches can use 'Combined Input and Crosspoint Queues' (CIXQ), and switches can use 'Combined Input, Crosspoint and Output Queues' (CIXOQ). The methods to reduce switch complexity to be presented in this document apply to all these switch designs.

Today's Internet Protocol network has relied upon a complex 'Best-Effort' design principle, for the last 40 years. Today's Best-Effort Internet network uses 'Best-Effort' switches and routers, which cannot provide any strict performance guarantees to the traffic flows they transport. For example, a Best-Effort switch cannot provide any strict delay or jitter guarantees on the packets it transports. The Best-Effort Internet frequently encounters congestion, where each Internet router can buffer millions of packets, and can experience delays of 10s to 100s of milliseconds. The end-to-end delays in the Best-Effort Internet can reach several 100s of milliseconds during times of congestion. As a result of congestion, today's Best-Effort Internet routers and switches are large, they are costly, and they consume great deals of power.

Consider the Cisco CRS-3 core router, which is described in the document [23] entitled "Cisco CRS Carrier Routing System Multishelf System Description", and paper [7] entitled "Securing the Industrial-Tactile Internet of Things with Deterministic Silicon Photonics Switches". A single Cisco CRS-3 router chassis consists of a cabinet of electronics, with dimensions of about 80 inches high, 24 inches wide, and 48 inches deep. One router chassis has a peak capacity of about 4.48 Terabits per second (Tbps), it weighs about 1,630 pounds (or 740 kilograms), and it consumes about 7.7 KiloWatts (kW) of power. The proposed methods and designs will establish that much of this hardware is unnecessary to transport data effectively.

Best-Effort routers and switches typically use 'iterative sub-optimal' algorithms for scheduling the transmission of packets through the switch. The iSLIP scheduling algorithm described in [18] is one example of an iterative scheduler. These schedulers examine the size of the queues on a switch, and typically make instantaneous scheduling decisions based upon the sizes of the queues. Typically, a queue with a large number of packets will receive preferential treatment over a queue with a small number of packets. These schedulers are 'sub-optimal', since their scheduling decisions depend upon the immediate state of the queues, and they do not consider past or future traffic patterns. These sub-optimal schedulers do not provide any strict guarantees for the delay or jitter of a packet through a switch. These iterative schedulers are complex, they are built into hardware circuits for maximum speed, and they cannot be modified by a network manager. As a result of iterative sub-optimal schedulers (and unregulated transmission rates from traffic sources), today's Best-Effort networks cannot provide any strict performance guarantees for end-to-end traffic flows, they cannot operate at 100% of capacity, and they often encounter congestion.

Best-Effort networks such as the Internet are typically operated at light loads, to lower congestion and to provide reasonable delays and jitters for traffic flows. This technique of operating a network at a fraction of its peak capacity is called 'over-provisioning', and today's Best-Effort Internet relies upon the significant over-provisioning of bandwidth to lower delays and congestion, and to provide reasonable delays and jitters for traffic flows. The current Best-Effort Internet functions because the backbone networks have been significantly over-provisioned to reduce congestion and to lower delays.

The paper [6] by T. H Szymanski entitled "Supporting Consumer Services over a Deterministic Industrial Internet Core Network", shows that 4 network manufacturers, including Cisco, Huawei, Ericsson and Alcatel-Lucent, sell about $74 Billion US per year in predominantly best-effort equipment. This equipment is typically utilized at less than 50% of its peak capacity, due to over-provisioning. In other words, about 50% of the yearly capital costs of new networking equipment is effectively wasted due to over-provisioning. This paper [6] shows that the over-provisioning of Best-Effort networks can cost the communications industry over $37 Billion US per year, in unnecessary capital costs. It has also been estimated that the Internet is contributing a noticeable percentage of all worldwide greenhouse gasses, thereby contributing to Global Warming and Climate Change.

Recent research has shown that 'Deterministic' networks offer many benefits over Best-Effort networks. A deterministic network supports deterministic traffic flows, which are also called 'Guaranteed Rate' (GR) traffic flows. A GR traffic flow can transmit packets at a guaranteed rate, along a fixed path from a source node to a destination node, through a network of deterministic packet-switches. A deterministic packet-switch will eliminate the use of the heuristic sub-optimal schedulers used in the Best-Effort Internet routers and switches. In a deterministic network, a logical controller can pre-compute deterministic transmission schedules for each switch in advance, and these schedules can be re-used as long as the traffic demands through a router or switch do not change.

Deterministic switches have been presented in several documents recently. The paper [5] by T. H. Szymanski entitled "A Low-Jitter Guaranteed Rate Scheduling Algorithm for Packet-Switched IP Routers", describes a deterministic CIOQ switch (Combined Input and Output Queues). It also describes a fast scheduling algorithm to schedule the packets of several GR traffic flows through an unbuffered crossbar switch with very low jitter. The patent [9], U.S. Pat. No. 8,089,959 B2, describes the CIOQ switch and the algorithm in more detail. The patent [12], U.S. Pat. No. 8,503,440 B2, describes a deterministic CIXOQ switch (Combined Input, Crosspoint and Output Queues). It also describes a fast scheduling algorithm, to schedule the packets of several GR traffic flows through crossbar switch with internal crosspoint buffers, with very low jitter.

The patent [10], U.S. Pat. No. 8,665,722, describes techniques to support deterministic or GR traffic flows in the Internet network. The patent [13], U.S. Pat. No. 8,681,609 B2, describes techniques to schedule multiple deterministic or GR traffic flows over one common output link. The patent [11], U.S. Pat. No. 8,619,556 B2, describes deterministic wireless switches or routers which support deterministic or GR traffic flows through a deterministic wireless mesh network. The wireless network can be for example a deterministic 5G wireless radio access network.

The paper [6], entitled "Supporting Consumer Services in a Deterministic Industrial Internet Core Networks", shows that deterministic communications can reduce the buffer sizes in Internet routers by a factor of about 100,000 times. The paper [7], entitled "Securing the Industrial-Tactile Internet of Things with Deterministic Silicon Photonics Switches", shows that deterministic communications can reduce the buffer sizes in Internet routers by a factor of about 1,000,000 times. These dramatic reductions in buffer sizes, potentially between 100,000 and 1,000,000 times, should enable the development of integrated optical packet switches with Terabits per second (Tbps) of capacity in the future, with dramatically reduced complexity compared to conventional Best-Effort switches and routers.

Previous deterministic or Guaranteed-Rate switch designs require that a packet-switch must process packet-headers, to determine the output port that an arriving packet must be sent to. Processing packet-headers can be a complex and costly process. For example, in a high-speed optical network the packets may arrive at data rates of 400 Gigabits per second (Gbps). An IPv4 packet with about 1500 bytes may arrive on a 400 Gbps link every 30 nanoseconds. The input port of a switch must process the packet-headers a rate of about one header every 30 nanoseconds, or about 33 million packet-headers per second. A switch with 64 input ports must therefore process packet-headers at a rate of about 2.1 billion packet headers per second. If the link data rates increase to potentially 4 Terabits per second, a switch with 64 input ports would have to process packet-headers at a rate of about 21 billion packet-headers per second, representing an extreme challenge to future high-speed optical networks.

Using IPv4 networks, the work to identify the traffic flow from a packet-header is complex. Several fields in the IPv4 packet must be processed: (i) the source IP address (with 32 bits), (ii) the destination IP address (with 32 bits), and typically (iii) the version field (with 4 bits). The processing of this many bits, at the rate of billions of packet-headers per second, will require an excessive amount of high-speed hardware logic and memory, which is very expensive and consumes considerable power. It is potentially impossible to fit this much high-speed logic into a single integrated circuit.

Using IPv6 networks, the work to identify the traffic flow from a packet-header is somewhat simpler. Only one field in the IPv6 packet must be processed; (i) the label field (with 20 bits). A 20 bit label can identify 1 millions flows. Typically, when an IPv6 packet arrives at a router, the label is extracted and used to read a Flow-Table, a memory module with up to 1 million rows. The Flow-Table returns the desired output port, and optionally a new 20-bit label to be written into the packet header when the packet leaves the switch. The use of flow-labels reduces the complexity of processing internet protocol packets in layer 3.

In an optical network, the Flow-Table must be extremely fast. Using 400 Gbps links, the first 400 bits of the packet will arrive in 1 nanosecond. The switch must extract a flow-label, and search for the flow-label in a very high-speed Flow-Table memory, with potentially 1 million entries. (A content-addressable memory design is often used, but this design is expensive). The Flow-Table should return the desired output port quickly, i.e., about 1 nanosecond, before too many more bits arrive. The design of an extremely high-speed Flow-Table memory with up to 1 million entries, which can respond within about 1 nanosecond, is a challenging task.

The paper [15] by Bolla et al, entitled "Energy Efficiency in the Future Internet: A survey of existing approaches and trends in energy-aware fixed network infrastructures", discusses the energy used to process packet headers. According to this paper, the processing of packet-headers will consume about 60% of the power of an Internet router's data-forwarding hardware. Recall the Cisco CRS-3 core router, which was summarized earlier. One chassis has a peak capacity of 4.48 Tbps, it weighs about 1,630 pounds, and it consumes about 7.7 kW of power. A noticeable fraction of this power goes to maintaining an excessive large very high-speed memory to buffer potentially millions of packets. According to the paper [15] by Bolla et al, approximately 60% of the router's power goes to processing the packet headers, to make a routing decision for each packet as it arrives.

In this paper, we present methods and hardware designs to significantly reduce the complexity and power-consumption of packet-switches. The methods and designs can reduce the excessively large packet buffers used in Best-Effort Internet routers, by a factor of potentially 100,000 to 1,000,000 times. The dramatic reductions in buffer sizes should enable the development of integrated optical packet-switches with Terabits per second (Tbps) of capacity in the future, which fit on a single integrated circuit package. According to the paper [7], "Securing the Industrial-Tactile Internet of Things with Deterministic Silicon Photonics Switches", an integrated single-chip optical packet-switch can also reduce Internet energy use by a factor of 100 to 1,000 times. The methods and designs proposed in this document can also remove the need to process packet-headers in a packet-switch or Internet router, potentially savings about 60% of a router's power consumption.

The proposed methods and designs will simultaneously achieve deterministic delay and jitter guarantees for provisioned Guaranteed-Rate traffic flows in a packet-switched network. A provisioned traffic flow is assigned to one or more paths through the network, where sufficient bandwidth has been reserved in advance (provisioned) for the flow on each link and each switch traversed by the traffic flow. The routing of paths through the network must be done so that no bandwidth capacity constraints are exceeded. (Every input port and output port of a switch, and every link between switches, has a bandwidth capacity constraint which cannot be exceeded.) The methods and hardware designs can be applied to both optical networks and 5G wireless networks. Specifically, the methods and hardware designs can be applied to general networks, including Internet Protocol (IP)

network, ATM networks, MPLS networks, Ethernet Networks, Infiniband network, optical networks and 5G wireless mesh networks.

Due to the dramatic reduction in complexity, deterministic or Guaranteed-rate switches and routers can cost less to build, they can be smaller, they can have higher performance and higher energy efficiency. Networks using these proposed methods and designs can operate their switches and links at essentially 100% of their peak capacity, and there is no need for significant over-provisioning to achieve Quality-of-Service (QoS) or performance guarantees. Therefore, the use of Deterministic or Guaranteed-Rate packet switching can save potentially $37 Billion US per year in wasted capital costs, and potentially more in the future.

The significant reductions in complexity and buffer sizes of deterministic packet-switches should enable the implementation of a single-chip integrated electronic packet switch within a decade, which can be realized on an electronic integrated circuit. FPGAs (Field Programmable Gate Arrays) are electronic integrated circuits, where the functionality can be programmed by the user in the field using Computer-Aided Design Tools (CAD) tools. FPGA devices are produced in quantities of millions of devices per year, and their cost is relatively low. An ASIC ('Application-Specific Integrated Circuit') is another type of integrated circuit, where the functionality is embedded into the hardware. ASIC devices can also be produced in quantities of millions of devices per year, but their cost is typically higher than FPGAs.

Our proposed methods and designs will offer dramatic reductions in the complexity of deterministic packet-switches, thereby allowing these switches to be realized using an FPGA or ASIC integrated circuit. These integrated circuits are placed in a package, for example a Ball Grid Array (BGA) package, which can typically receive and transmit electronic data at a rate of a few Tbps. Using the techniques proposed in this document, a reduced-complexity deterministic electronic packet-switch with a capacity of a few Tbps can fit on a single FPGA or ASIC, which can be packaged into a conventional integrated circuit package, i.e., a BGA package. A single electronic integrated circuit can have potentially the same capacity (about 4.48 Tbps), as the Cisco CRS-3 router chassis which weights 1,640 pounds and consumes about 7.7 kW of power.

Our proposed methods and designs will offer significant reductions in complexity and buffer sizes, which will also enable the implementation of an integrated 'All-Optical' packet switch. All-Optical packet-switches will buffer and process packets in the optical domain, without conversion to and from the electrical domain. The amount of buffering feasible in an all-optical switch is limited to a very small number of packets, for example a few hundred packets per switch. For example, an optical packet can be buffered in a loop of fiber where the packet is recirculated until it is needed. Alternatively, paper [22] illustrates that the company NTT in Japan has recently developed an integrated circuit which can buffer a few hundred bits of information optically. Our methods and designs will offer a reduced-complexity deterministic all-optical packet, which will enable an entire all-optical switch to fit on one integrated circuit in the future.

Silicon-Photonics is a new integrated circuit technology, which can process both electronic data and optical data, and it can easily convert data between the electrical and optical domains. This technology is described in paper [20] entitled "Silicon Photonics for Next Generation System Integration Platform", and paper [21] entitled "Silicon-CMOS Integrated Nano-Photonics for Computer and Data-Communications Beyond 100G". A Silicon-Photonics integrated circuit is manufactured using traditional CMOS manufacturing technologies, and can be produced in large volumes of millions of devices per year, with relatively low costs. Many integrated Ethernet packet transmitter-and-receiver circuits, called 'Ethernet Transceivers', are commercially manufactured using Silicon-Photonics technologies. However, integrated packet switches using Silicon Photonics have not been manufactured to date, since the complex issues of buffer sizing, packet scheduling, packet formatting, and packet routing which occur in a Best-Effort packet switch have never been adequately addressed. Our proposed methods and designs eliminate all the outstanding complex issues in the design of a Best-Effort packet-switch, by resorting to a far simpler deterministic (or Guaranteed-Rate) optical packet switch design.

Intel has recently developed a low-cost technology in which multiple CMOS integrated circuit die can be placed on one packaging substrate, such as BGA package. Another CMOS integrated circuit is used as an 'electronic bridge' to interconnect the die, with thousands of high-speed low-energy electronic wires. Our proposed method and designs will allow for the development of an integrated deterministic packet-switch on a single integrated circuit package, such as a BGA package. In this design, several Silicon-Photonics transceiver die can be combined with one or more FPGA or ASIC die, to form an integrated optical packet-switch. The transceivers convert between the electrical and optical domains, and the FPGAs or ASICs perform the packet processing and switching in the electronic domain. All these integrated circuits can be placed into a single low-cost integrated circuit package, such as a BGA package.

According to the paper [7], "Securing the Industrial-Tactile Internet of Things using Deterministic Silicon Photonic Switches", cyber-security remains an outstanding challenge for the Internet in the 21-st century. Our proposed designs will offer significant increase in the level of protection from cyber-attacks. Using our proposed methods and designs, the arrival times of authorized packets on a link are pre-determined by the use of periodic schedules. Therefore, it is possible to detect an unauthorized packet from a cyber-attacker. A schedule of arriving packets and their time-slots at each switch can be precomputed in the SDN control-plane, which has a global view of the network and has sufficient knowledge to compute such a schedule. The SDN control-plane can then send each switch the arrival schedule for each input port. (It is impossible for a switch, in isolation, to compute such schedules since it does not have enough information.) Any packet that arrives during a time-slot for which no packet arrival is scheduled, must be un-authorized and must be from a cyber-attacker. If too many packets are received from a Guaranteed-Rate traffic flow, then some packets must be unauthorized and may come from a cyber-attacker. A controller can notify the SDN control-plane whenever an unauthorized packet is received. For example, it will be impossible for a cyber-attacker to create a 'Denial of Service' (DOS) attack, since a cyber-attacker cannot transmit any packets on any link without detection. A DOS attack generally involves flooding a network with unauthorized packets, and this is not possible in a deterministic network.

SUMMARY

In one aspect, there is provided a method of operating a plurality of switches within a packet-switched network that delivers pre-established Guaranteed-Rate (GR) traffic flows, each of said plurality of switches comprising N input ports; M output ports; N×M queues, wherein each of said N input ports is associated with M of said N×M queues and each of said M output ports is associated with N of said N×M queues, and wherein each of said N×M queues buffers packets from a particular one of said N input ports destined to a particular one of said M output ports; wherein each of said N×M queues is further partitioned into a set of flow-queues, wherein each of said flow-queue buffers packets that belong to a distinct traffic flow across said network, and wherein each of said flow-queues is associated with a guaranteed data-rate; a first memory, a second memory, said method comprising; for each switch of said plurality of switches, determining which of said GR traffic flows will arrive at each of said N input ports of that switch, and which of said GR traffic flows will depart on each of said M output ports of that switch, in each time-slot of a scheduling frame; determining for each input port of said N input ports at that switch, a first periodic schedule that identifies which of said M queues to buffer each arriving packet for that input port, based upon the arrival time-slot of that arriving packet within said scheduling frame; determining for each of said N input ports at that switch, a second periodic schedule that identifies which of the flow-queues to buffer each arriving packet for that input queue, based upon the arrival time-slot of that arriving packet within said scheduling frame; storing the first periodic schedules for each of said N input ports in said first memory of that switch; storing the appropriate one of said second periodic schedules for each of said N input ports in said second memory of that switch.

In another aspect, there is provided a deterministic packet switch for switching plurality of guaranteed-rate traffic flows over a set of output ports, over a scheduling frame comprising F time-slots, without processing packet headers, comprising: N input ports, M output ports, a switching matrix to interconnect said N input ports and said M output ports comprising N×M queues, wherein each of said N input ports is associated with M of said N×M queues and each of said M output ports is associated with N of said N×M queues, and wherein each of said N×M queues buffers packets from a particular one of said N input ports destined to a particular one of said M output ports; wherein each of said N×M queues is partitioned into a set of flow-queues, wherein each of said flow-queues buffers packets which belong to a distinct one of said guaranteed rate traffic flows; a first memory for storing a periodic first-schedule, wherein said periodic first-schedule specifies which of said M queues associated with an input port, if any, is enabled to receive and buffer a packet in each time-slot in said scheduling frame; a second memory for storing a periodic second-schedule, wherein said second-schedule specifies which of the flow-queues in a queue of said N×M queues, if any, is enabled to receive and buffer a packet in each time-slot in said scheduling frame, a master-controller operable to exchange control packets with a network control plane, wherein said master-controller can configure said first memory with said periodic first schedule, and said second memory with said periodic second schedule; wherein said first-schedule provides each queue with a guaranteed number of time-slot reservations for receiving packets in a scheduling frame, sufficient to satisfy a guaranteed data-rate assigned to that queue, wherein said second-schedule provides each flow-queue with a guaranteed number of time-slot reservations for receiving packets in a scheduling frame, sufficient to satisfy the guaranteed data rate for the distinct one of said guaranteed flows buffered from which packets are buffered in that flow-queue.

In yet another aspect, there is provided a deterministic packet switch for switching the packets of a plurality of guaranteed-rate traffic flows over a set of output ports, over a scheduling frame comprising F time-slots for integer F, without processing packet headers, comprising: N input ports, M output ports, N×M queues, wherein each of said N input ports is associated with M of said N×M queues and each of said M output ports is associated with N of said N×M queues, and wherein each of said N×M queues buffers packets from a particular one of said N input ports destined to a particular one of said M output ports wherein each of said N×M queues is further partitioned into a set of flow-queues, wherein each of said flow-queue buffers packets that belong to a distinct one of said guaranteed rate traffic flows; a switch for interconnecting said input ports to said output ports, a first memory storing a periodic first-schedule, wherein said periodic first-schedule specifies which of said N×M queues associated with an input port, if any, is enabled to receive and buffer a packet in each time-slot in said scheduling frame, based upon the arrival time of that packet in said scheduling frame; a second memory storing a periodic second-schedule, wherein said second-schedule specifies which of the flow-queues in a queue of said N×M queues, if any, is enabled to receive and buffer a packet in each time-slot in said scheduling frame, based upon the arrival time that packet in said scheduling frame, a master-controller operable to exchange control packets with a network control plane, wherein said master-controller can configure said first memory with said periodic first schedule, and said second memory with said periodic second schedule; wherein said first-schedule provides each queue with a guaranteed number of time-slot reservations for receiving packets in a scheduling frame, sufficient to satisfy a guaranteed data-rate assigned to that queue, wherein said second-schedule provides each flow-queue with a guaranteed number of time-slot reservations for receiving packets in a scheduling frame, sufficient to satisfy the guaranteed data rate for the distinct one of said guaranteed flows buffered from which packets are buffered in that flow-queue.

In one embodiment, a method to remove the need to process packet-headers to extract routing information in a deterministic packet switch is provided. The deterministic packet switch can provide deterministic or guaranteed-rate service to traffic flows. The switch contains N input ports, M output ports and N*M Virtual Output Queues (VOQs). Packets are associated with a traffic flow, which arrive on an input port and depart on an output port, according to a predetermined routing. These packets are buffered in a VOQ. The switch has controllers which can be configured to store several deterministic periodic schedules, which can be configured by an SDN control-plane. A first deterministic periodic schedule can determine for every input port at which time-slots packets may arrive, for every time-slot in a scheduling frame. This schedule can also identify the VOQ to buffer each arriving packet. A second deterministic periodic schedule can identify which Flow-VOQ within a VOQ should receive the arriving packet, in each time-slot. The need to process packet-headers in real-time is eliminated. The memory to store the deterministic periodic schedules can operate at relatively slow clock rates, and is therefore much less complex than the very fast memory used in traditional Flow-Tables. A controller can monitor the packet arrivals to detect unauthorized packets from a cyber-attacker, and inform the SDN control-plane.

In another embodiment, a reduced-complexity integrated electronic packet switch which can provide deterministic or guaranteed-rate service to traffic flows and traffic classes is described. The switch contains N input ports, M output ports and N*M Virtual Output Queues (VOQs). Packets are associated with a traffic flow or traffic class, which arrive on an input port and depart on an output port, according to a predetermined routing. These packets are buffered in a VOQ. The switch has controllers which can be configured to store several deterministic periodic schedules, which can be configured by an SDN control-plane. A first deterministic periodic transmission schedule can determine which VOQs are enabled to transmit, for every time interval in a scheduling interval. A second deterministic periodic schedule can identify which Flow-VOQ within a VOQ is enabled to transmit, in each time interval. A Flow-Table can be used to identify to which VOQ an arriving packet (if any) is destined. A controller can monitor the packet arrivals and departures to detect unauthorized packets from a cyber-attacker, and inform the SDN control-plane. Each traffic flow or traffic class can receive a deterministic and guaranteed-rate of transmission through the switch. Buffer sizes can be reduced by a factor of potentially 100,000 to 1,000,000 times, compared to conventional Best-Effort routers. The use of flow labels and a Flow-Table also reduces header processing to a minimum. The entire switch can be realized on one electronic integrated circuit package.

In another embodiment, a reduced-complexity integrated electronic packet switch which can provide deterministic or guaranteed-rate service to traffic flows is described. The switch contains N input ports, M output ports and N*M Virtual Output Queues (VOQs). Packets are associated with a flow or traffic class, which arrive on an input port and depart on an output port, according to a predetermined routing. These packets are buffered in a VOQ. The switch has controllers which can be configured to store several deterministic periodic schedules, which can be configured by an SDN control-plane. A first deterministic periodic transmission schedule can determine which VOQs are enabled to transmit, for every time interval in a scheduling interval. A second deterministic periodic schedule can identify which Flow-VOQ within a VOQ is enabled to transmit, in each time interval. A third deterministic periodic schedule can be used to identify to which VOQ an arriving packet (if any) is destined. A fourth deterministic periodic schedule can be used to identify to which Flow-VOQ within a VOQ an arriving packet (if any) is destined. A controller can monitor the packet arrivals and departures to detect unauthorized packets from a cyber-attacker, and inform the SDN control-plane. Each traffic flow or traffic class can receive a deterministic and guaranteed-rate of transmission through the switch. Buffer sizes can be reduced by a factor of potentially 100,000 to 1,000,000 times, compared to conventional Best-Effort routers. All packet header processing is eliminated, resulting in a significant reduction in complexity. The entire switch can be realized on one electronic integrated circuit package.

In another embodiment, a reduced-complexity integrated photonic packet switch which can provide deterministic or guaranteed-rate service to traffic flows and traffic classes is described. The switch contains N input ports, M output ports and N*M Virtual Output Queues (VOQs). The input and output ports are realized using one or more Silicon Photonics transceivers. The switching function is implemented on an FPGA or ASIC. Packets are associated with a flow or a class, which arrive an input port and depart on an output port, according to a predetermined routing. These packets are buffered in a specific VOQ. The switch can be configured to store several deterministic periodic schedules, which can be configured by an SDN control-plane. A first deterministic periodic transmission schedule can determine which VOQs are enabled to transmit, for every time interval in a scheduling interval. A second deterministic periodic schedule can identify which Flow-VOQ within a VOQ is enabled to transmit, in each time interval. A Flow-Table can be used to identify to which VOQ and to which Flow-VOQ an arriving packet (if any) is destined. A controller can monitor the packet arrivals and departures to detect unauthorized packets from a cyber-attacker, and inform the SDN control-plane. Each traffic flow or traffic class can receive a deterministic and guaranteed-rate of transmission through the switch. Buffer sizes can be reduced by a factor of potentially 100,000 to 1,000,000 times, compared to conventional Best-Effort routers. The use of flow labels and a Flow-Table also reduces header processing to a minimum. The entire photonic packet switch can be realized on one integrated circuit package, which contains the Silicon Photonics transceiver die and the FPGA or ASIC die.

In another embodiment, a reduced-complexity integrated photonic packet switch which can provide deterministic or guaranteed-rate service to traffic flows is described. The switch contains N input ports, M output ports and N*M Virtual Output Queues (VOQs). The input and output ports are realized using Silicon Photonics transceivers. The switching function is implemented on an FPGA or ASIC. Packets are associated with a flow, which arrive an input port and depart on an output port, according to a predetermined routing. These packets are buffered in a specific VOQ. The switch can be configured to store several deterministic periodic schedules, which can be configured by an SDN control-plane. A first deterministic periodic transmission schedule can determine which VOQs are enabled to transmit, for every time interval in a scheduling interval. A second deterministic periodic schedule can identify which Flow-VOQ within a VOQ is enabled to transmit, in each time interval. A third deterministic periodic schedule is used to identify to which VOQ an arriving packet (if any) is destined. A fourth deterministic periodic schedule can be used to identify to which Flow-VOQ within a VOQ an arriving packet (if any) is destined. A controller can monitor the packet arrivals and departures to detect unauthorized packets from a cyber-attacker, and inform the SDN control-plane. Each traffic flow can receive a deterministic and guaranteed-rate of transmission through the switch. Buffer sizes can be reduced by a factor of potentially 100,000 to 1,000,000 times, compared to conventional Best-Effort routers. All packet header processing is eliminated, resulting in a significant reduction in complexity. The entire photonic switch can be realized on one integrated circuit package, which contains the Silicon Photonics transceiver die and the FPGA or ASIC die.

In another embodiment, a reduced-complexity all-optical packet switch which can provide deterministic or guaranteed-rate service to traffic flows is described. The switch contains N input ports, and M output ports, where each input port has a plurality of packet buffers. These components are implement entirely in the optical domain. Packets are associated with traffic flows, which arrive an input port and depart on an output port, according to a predetermined routing. At each input port, the packets are buffered in a packet buffer in the optical domain. The switch has electronic controllers which can be configured to store several deterministic periodic schedules, which can be configured by an SDN control-plane. A first deterministic periodic transmission schedule can determine which input ports are enabled to transmit, for every time interval in a scheduling interval. A second deterministic periodic schedule can identify which packet buffer within an input port is enabled to transmit, in each time interval. A third deterministic periodic schedule can be used to identify to which packet buffer an arriving packet (if any) is destined. A controller can monitor the packet arrivals to detect unauthorized packets from a cyber-attacker, and inform the SDN control-plane. Each traffic flow can receive a deterministic and guaranteed-rate of transmission through the switch. Buffer sizes can be reduced by a factor of potentially 100,000 to 1,000,000 times, compared to conventional Best-Effort routers. All packet header processing is eliminated, resulting in a significant reduction in complexity.

In another embodiment, a reduced-complexity integrated photonic packet switch which can provide deterministic or guaranteed-rate service to traffic flows and traffic classes, and which provides a significant protection from cyber-attacks, is described. The switch contains N input ports, M output ports and N*M Virtual Output Queues (VOQs). The input and output ports are realized using one or more Silicon Photonics transceivers. The switching function is implemented on an FPGA or ASIC. Packets are associated with a flow or a class, which arrive an input port and depart on an output port, according to a predetermined routing. These packets are buffered in a specific VOQ. The switch can be configured to store several deterministic periodic schedules, which can be configured by an SDN control-plane. A first deterministic periodic transmission schedule can determine which VOQs are enabled to transmit, for every time interval in a scheduling interval. A second deterministic periodic schedule can identify which Flow-VOQ within a VOQ is enabled to transmit, in each time interval. A Flow-Table can be used to identify to which VOQ and to which Flow-VOQ an arriving packet (if any) is destined. A controller can monitor the packet arrivals and departures to detect unauthorized packets from a cyber-attacker, and inform the SDN control-plane. Each traffic flow or traffic class can receive a deterministic and guaranteed-rate of transmission through the switch. Buffer sizes can be reduced by a factor of potentially 100,000 to 1,000,000 times, compared to conventional Best-Effort routers. The use of flow labels and a Flow-Table also reduces header processing to a minimum. The entire photonic packet switch can be realized on one integrated circuit package, which contains the Silicon Photonics transceiver die and the FPGA or ASIC die.

In another embodiment, a reduced-complexity integrated photonic packet switch which can provide deterministic or guaranteed-rate service to traffic flows, and which provides a significant protection from cyber-attacks, is described. The switch contains N input ports, M output ports and N*M Virtual Output Queues (VOQs). The input and output ports are realized using Silicon Photonics transceivers. The switching function is implemented on an FPGA or ASIC. Packets are associated with a flow, which arrive an input port and depart on an output port, according to a predetermined routing. These packets are buffered in a specific VOQ. The switch can be configured to store several deterministic periodic schedules, which can be configured by an SDN control-plane. A first deterministic periodic transmission schedule can determine which VOQs are enabled to transmit, for every time interval in a scheduling interval. A second deterministic periodic schedule can identify which Flow-VOQ within a VOQ is enabled to transmit, in each time interval. A third deterministic periodic schedule is used to identify to which VOQ an arriving packet (if any) is destined. A fourth deterministic periodic schedule is used to identify to which Flow-VOQ an arriving packet (if any) is destined. A controller can monitor the packet arrivals and departures to detect unauthorized packets from a cyber-attacker, and inform the SDN control-plane. Each traffic flow or traffic class can receive a deterministic and guaranteed-rate of transmission through the switch. Buffer sizes can be reduced by a factor of potentially 100,000 to 1,000, 000 times, compared to conventional Best-Effort routers. All packet header processing is eliminated, resulting in a significant reduction in complexity. The entire photonic switch can be realized on one integrated circuit package, which contains the Silicon Photonics transceiver die and the FPGA or ASIC die.

Other aspects and features of the present invention will become apparent to those of ordinary skill in the art upon review of the following description of specific embodiments of the invention in conjunction with the accompanying figures.

BRIEF DESCRIPTION OF THE DRAWINGS

The figures illustrate by way of example only, embodiments of the present invention.

FIGS. 4A and 4B illustrate a method to eliminate the need to process packet-headers.

FIG. 5A illustrates the typical packet format of an Ethernet packet. FIG. 5B illustrates the typical packet format of an IPv4 packet. FIG. 5C illustrates the typical format of IPv6 packet header.

FIG. 9A shows a Flow-Table which processes flow-labels extracted from a packet header. FIG. 9B shows a Flow-Table which aggregates many flows into 1 flow.

FIG. 9C shows a deterministic schedule, which can replace the very high-speed Flow-Table in FIG. 9B.

DETAILED DESCRIPTION

FIG. 1

Figure 1A:
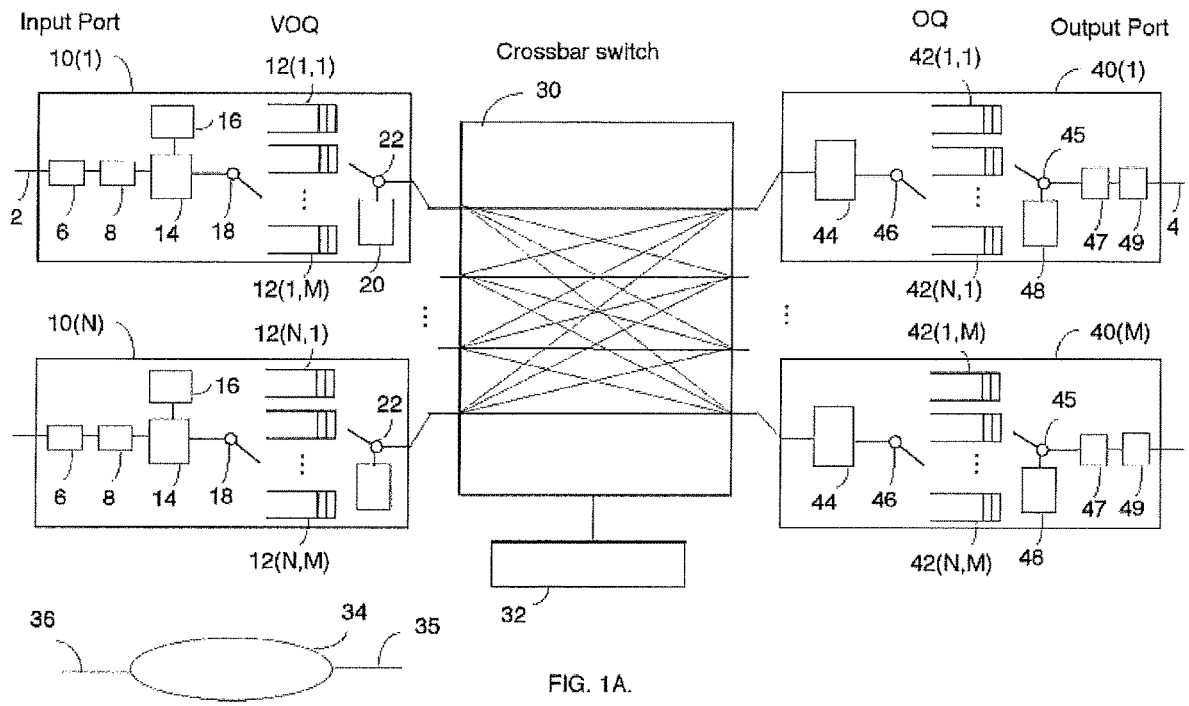
FIG. 1A shows a CIOQ switch (Combined Input and Output Queues).

A deterministic packet-switch with Combined Input Queues (IQ) and Output Queues (OQs) is shown in FIG. 1A. This switch is called a 'Deterministic Combined Input and Output Queued' (CIOQ) switch. The CIOQ switch (or Internet router) has N input ports (IPs) 10, M output ports (OPs) 40, and a unbuffered crossbar switch 30 to provide connections between the input and output ports. The switch interconnects incoming fibers 2 and outgoing fibers 4.

Each input port 10 has M 'Virtual Output Queues' (VOQs) 12. The M VOQs at input port 10(1) are identified with labels 12(1,1) . . . 12(1,M). Each VOQ 12$(j,k)$ buffers packets which arrive at input port 10$j$ and depart on output port 40$k$, for 1<=$j$<=N, and 1<=$k$<=M. Each output port 40 has N 'Output Queues' 42. The N output queues at output port 40(1) are identified with labels 42(1,1) . . . 42(N,1). Each output queue 42$(j,k)$ may buffer packets which arrive at input port 10$j$ and depart on output port 40$k$, for 1<=$j$<=N, and 1<=$k$<=M.

Packets arrive at the input ports 10 on an optical fiber 2. Each input port 10 has an optical-to-electrical (OE) receiver 6, and a packet buffer 8 to receive and buffer a packet, which is forwarded to the controller 14. The controller 14 reads the packet-header to identify the traffic flow. The controller 14 sends information extracted from the packet-header to the Flow-Table 16. The Flow-Table 16 is a very fast memory, which identifies to which output port 40 the packet should be forwarded to. Each VOQ buffers packets directed to a distinct output port, so identifying the output port identifies the VOQ to buffer the packet. The Flow-Table 16 may be organized as a Content-Addressable Memory, or as a Cache Memory to provide fast memory access. The controller 14 can then control the demultiplexer 18, to forward the packet to the correct VOQ 12.

A switch-controller 32 controls the switch 30, to establish connections between input ports 10 and output ports 40. Two constraints must be met in a CIOQ switch: (1) each input port 10 must be connected to at most 1 output port, and (ii) each output port must be connected to at most 1 input port. These two constraints make the scheduling problem hard.

Each Input Port 10 also has a controller 20 to control a multiplexer 22. When the switch-controller 32 establishes a connection between an input port 10 and an output port 40, the controller 20 will select the VOQ for transmission which buffers packets for the desired output port 40. The data to transmit can be a packet or a cell. The controller 20 will control the multiplexer 22 to select the VOQ 12 for service, which can forward the data through the switch 30 to the output port 40.

The Internet network transports variable-size Internet Protocol packets. A large variable-size IP packet which arrives at an input port 10 may be segmented into smaller fixed-sized units of data called 'cells', for transmission through a discrete-time switch, where time is split into time-slots. (These cells can be viewed as small packets, which contain small fragments of a larger IP packet.) The cells or packets are buffered in the VOQs 12. Let a clock identify time-slots. In each time-slot, cells or packets are transmitted through the switch 30 from the input ports 10 to the output ports 40. At the output port 40, the original variable-size Internet Protocol packet may be reconstructed in the output queues 42.

The CIOQ switch can operate in a discrete-time manner with time-slots, or in a continuous-time manner without time-slots. A discrete-time switch operates with discrete time-slots, where a time-slot has sufficient duration to transmit a small IP packet or a cell from an input port 10 to an output port 40. In contrast, in a continuous-time switch without time-slots, a variable-size packet may transmitted through the switch directly, without being segmented into smaller cells.

In a Best-Effort CIOQ switch which uses time-slots, the switch-controller 32 can compute the connections to be established between the input ports 10 and output ports 40 using a sub-optimal iterative scheduling algorithm, for every time-slot. The iSLIP scheduling algorithm described in paper [18] is one example of an iterative scheduler.

At an output port 40, data (a cell or packet) which arrives is processed by a controller 44, which controls a de-multiplexer 46, which can deliver the data to the proper output queue 42. Variable-size Internet Protocol packets can be reconstructed from the smaller fixed-sized cells at the output queues 42. A controller 48 can control a multiplexer 45 to select a reassembled Internet Protocol packet for transmission. A packet selected for transmission from an output queue 42 may be sent to a packet buffer 47, and then sent to an electrical-to-optical (EO) transmitter 49, which sends the optical transmission on an output fiber 4.

The proposed methods and designs to achieve a reduced-complexity packet-switch can be applied to a deterministic CIOQ packet switch which transmits deterministic traffic flows, where each deterministic traffic flow has a Guaranteed Rate (GR) of transmission. In a deterministic discrete-time CIOQ switch, the switch-controller 32 can store a precomputed or deterministic schedule of switch configurations, which are valid for an interval of time called a Scheduling-Frame. A Scheduling-Frame may consist of F time-slots, for a positive integer F. The deterministic-schedule may connect input ports 10 to output ports 40 in each time-slot, so that a Guaranteed-Rate of transmission can be provided from each input port to each output port. A fast recursive algorithm to compute the deterministic schedule for a CIOQ switch is provided in the patent [9] entitled "Method and Apparatus to Schedule Packets Through a Crossbar Switch with Delay Guarantees", U.S. Pat. No. 8,089,959 B2, January 2012.

The CIOQ switch can be controlled by a master-controller 34, which receives commands from an external entity called the SDN control-plane 110 (not shown on FIG. 1A). (An SDN control-plane is shown in FIG. 6B ahead.) The master-controller 34 can receive control packets from the SDN control-plane over wires 36. The master-controller 34 can also send control packets to the SDN control-plane over wires 35. The wires 36 and 35 may be connected to some input ports and output ports of the switch (these connections are not shown in FIG. 1).

Figure 1B:
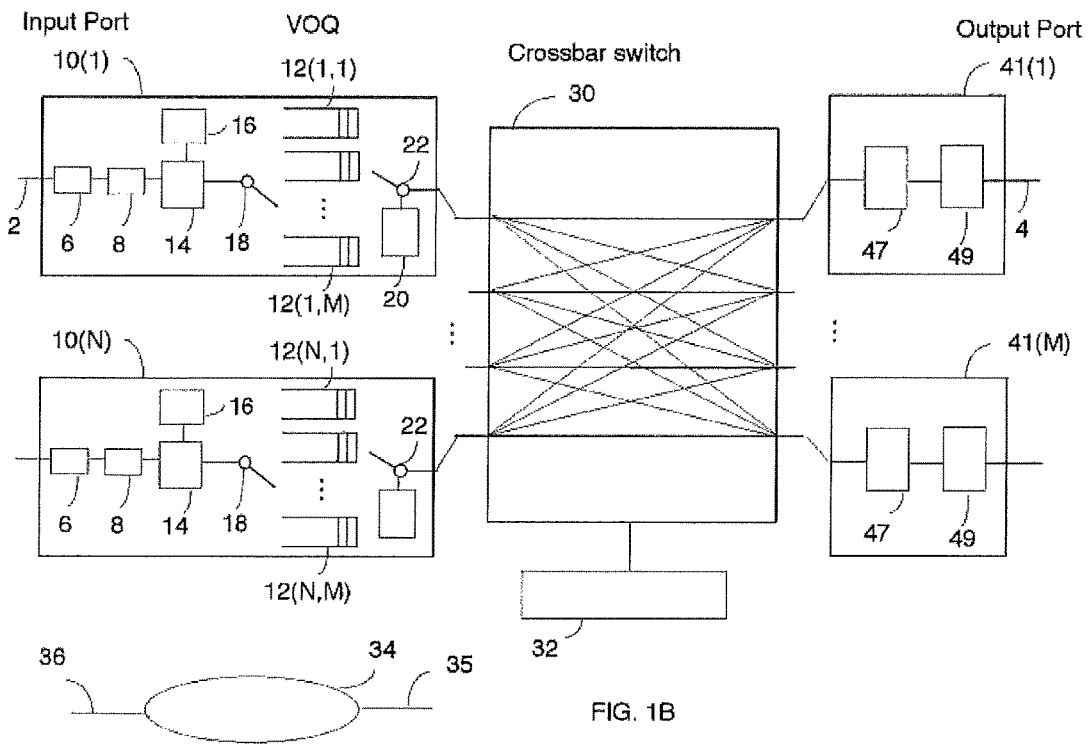
FIG. 1B shows an IQ switch (Input Queues).

FIG. 1B illustrates a switch with Input Queues. The IQ switch is similar to the CIOQ switch in FIG. 1A, except that the output ports 40 are replaced with simpler output ports 41, which do not contain output queues 42. A packet which arrives at the output port 41 can be received in the packet buffer 47, and then sent to an EO transmitter 49, which sends the optical transmission on an output fiber 4. (In this reduced-complexity design, packets are not segmented into cells and packets are not reassembled from cells. This design is suitable for a layer 2 transport network.)

Figure 1C:
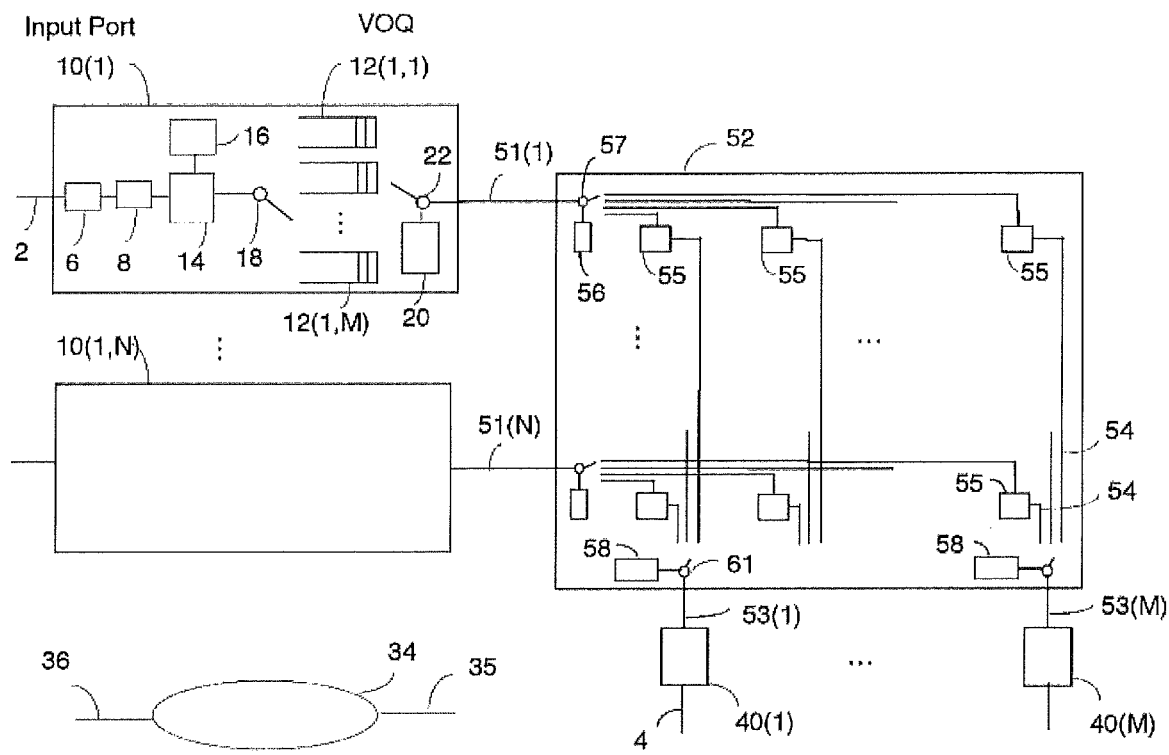
FIG. 1C shows a CIXOQ switch (Combined Input, Crosspoint and Output Queues.)

FIG. 1C illustrates a CIXOQ switch, which uses a Combination of Input Queues, Crosspoint Queues and Output Queues. The N×M CIXOQ switch shown in FIG. 1C has N Input Ports 10, M Output Ports 40, and a buffered crossbar switch 52 interconnecting these input ports 10 and output ports 40. The operation of the input ports 10 and output ports 40 has been explained in CIOQ switch in FIG. 1, and this behaviour is the same in the CIXOQ switch.

The buffered crossbar switch 52 has N rows and M columns, where the intersection of each row and column contains a crosspoint buffer 55. Each input port 10 is connected to one row of the switch 52, through a wire (or transmission line) 51. Each output port 40 is connected to one column of the switch 52, through a wire (or transmission line) 53. Each input port 10 can transmit data into the switch 52 through a wire 51. (The data can be an Internet Protocol packet or a cell.) Each output port 40 can receive data from the switch 52 on a vertical wire 53. In switch 52, each row has a controller 56, to control a demultiplexer 57, to send incoming data arriving on wire 51 to the correct crosspoint buffer 55 in the row. Alternatively, the multiplexer 57 can also be controlled by the controller 20, since there is a one-to-one correspondence between VOQs 12 and crosspoint buffers 55. (There are N*M VOQs, and there are N*M crosspoint buffers.) Each column has a controller 58, which controls a multiplexer 61, to select a crosspoint buffer 55 to send data to the output port 40, over an outgoing wire 53.

In a Best-Effort CIXOQ switch, the controller 20 can select one VOQ 12 to transmit data into the switch 52, according to some Best-Effort sub-optimal algorithm. Similarly, the controller 58 can select an XQ 55 to transmit data to an output port 40, according to some Best-Effort sub-optimal algorithm. A typical Best-Effort sub-optimal algorithm will select the VOQ or crosspoint buffer with the largest amount of data to service next. Such an algorithm is sub-optimal since it does not consider past or future traffic demands, and the switch will have poor sub-optimal performance.

The switch in FIG. 1C can also be operated in a deterministic manner. A deterministic CIXOQ packet switch will transmit deterministic traffic flows, where each deterministic traffic flow has a Guaranteed Rate (GR) of transmission. In a deterministic CIXOQ switch, all the controllers 20, 56 and 58 should operate according to deterministic pre-computed periodic schedules. Methods to compute deterministic periodic schedules for the CIXOQ switch have been presented in [12], entitled "Crossbar Switch and Recursive Scheduling", U.S. Pat. No. 8,503,440 B2, Aug. 6, 2013.

For example, in each input port 10, the controller 20 can have memory to store a pre-computed deterministic transmission schedule, which is valid for Scheduling Frame which consists of F time-slots, for a positive integer F. The deterministic transmission schedule in each input port 10 will connect that input port to the switch 52, so that a Guaranteed-Rate of transmission can be provided from that input port to the crosspoint buffers 55 in switch 52, sufficient to satisfy the Guaranteed-Rate demands of the VOQs 12 associated with that input port 10. A fast recursive algorithm to compute the deterministic transmission schedule for each input port 10 in an CIXOQ switch is provided in reference [12], entitled "Crossbar Switch and Recursive Scheduling", U.S. Pat. No. 8,503,440 B2, Aug. 6, 2013.

Similarly, in a deterministic CIXOQ switch, in each column of the switch 52, the controller 58 can contain memory, to store a pre-computed deterministic periodic schedule. The deterministic schedule will specify which crosspoint buffer 55 is enabled to transmit data to the output port 42, in each time-slot of a scheduling frame, so that a Guaranteed-Rate of transmission can be provided from the crosspoint buffers 55 to the output ports 40.

Figure 7:
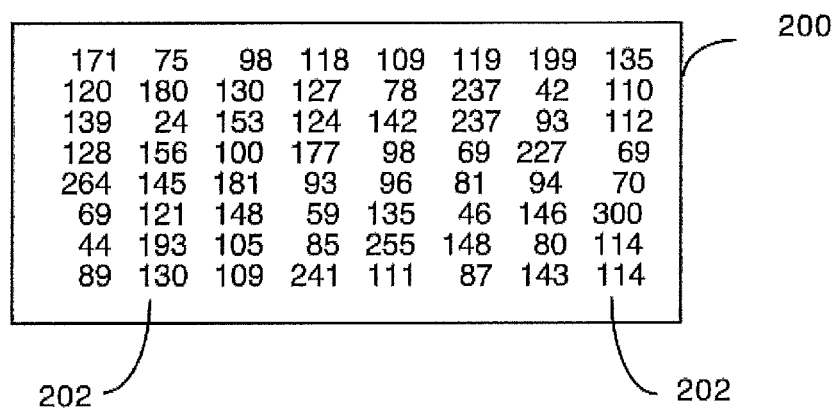
FIG. 7 illustrates a traffic matrix of guaranteed rates to be supported in a deterministic packet-switch.

In FIG. 1C, the CIXOQ switch also has a master-controller 34, which can receive control packets from an SDN control-plane 110 (not shown in FIG. 1C) over wires 36. The master-controller 34 can also send control packets to the SDN control-plane over wires 35. The wires 36 and 35 are typically connected to some input ports and output ports (these connects are not shown in FIG. 2). The master-controller 34 can configure the controllers 20, 56 and 58, with the pre-computed deterministic periodic schedules. These schedules can be computed in the SDN control-plane, and sent to the master-controller 34 in control packets. Alternatively, the SDN control-plane can send the traffic demand matrix for the switch, which specifies the traffic demands from input ports to output ports, to the master-controller 34. The master-controller 34 can then compute the deterministic periodic schedules, and configure the controllers 20, 56 and 58. (A traffic demand matrix is shown in FIG. 7 ahead.)

Figure 2:
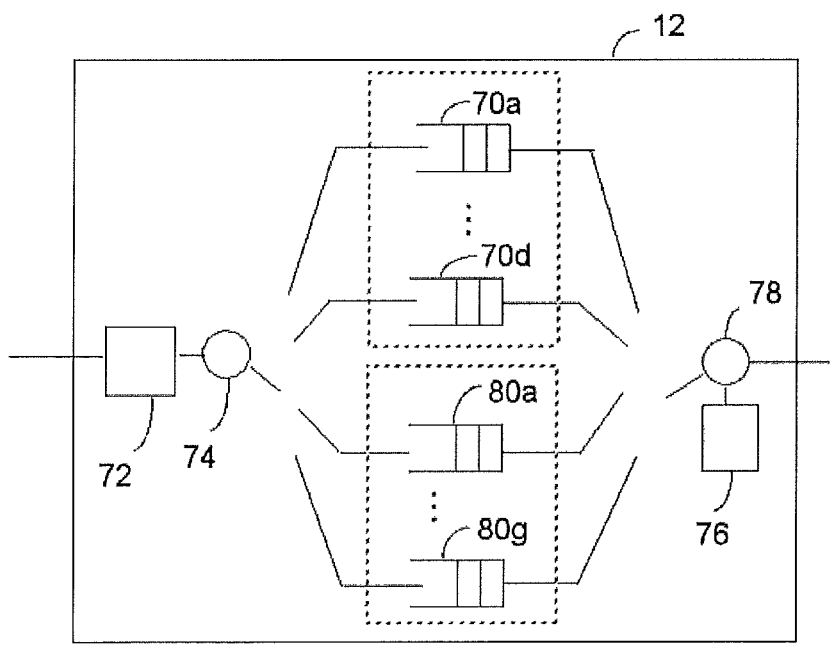
FIG. 2 shows the organization of a Virtual Output Queue (VOQ) with several sub-queues, i.e., Flow-VOQs and Class-VOQs.

FIG. 2—A VOQ with Sub-Queues

FIG. 2 illustrates the internal structure of a VOQ 12. The VOQ 12 can have zero or more Class-VOQs 70 to store data (packets or cells) which belong to a traffic class. Each Class-VOQ 70 can store the data which belongs to one traffic class, which arrive on a specific input port and depart on a specific output port. Specifically, each Class-queue 70 can store packets from several traffic flows, perhaps thousands or millions of traffic flows, which all belong to the same traffic class. Each Class-OQ 70 can receive a Guaranteed-Rate of service in a deterministic switch. However, the individual traffic flows within the Class-VOQ are not selected for service on an individual basis. For example, the data in a Class-VOQ could be selected for service using a 'First-Come First-Served' algorithm. Class-VOQs can improve the scalability of deterministic switches and networks, by grouping thousands or millions of different traffic flows into one common traffic class, and by providing a Guaranteed-Rate of service for each traffic class in each deterministic switch.

A VOQ 12 in FIG. 2 can also have zero or more Flow-VOQs, 80a . . . 80g. A Flow-VOQ 80 stores the data (packets or cells) of one specific GR traffic flow. For example, all the traffic from one city A to another city B could be aggregated into one traffic flow, and this traffic flow can be assigned a Guaranteed-Rate of transmission. An SDN control-plane can allocate a Flow-VOQ 80 for this traffic flow, in each switch it traverses in the path from city A to city B.

A VOQ 12 can have a controller 72, to control a demultiplexer 74, which can direct incoming data to the correct sub-queue within the VOQ, either a Class-VOQ 70 or Flow-VOQ 80. The VOQ can have a controller 76, which controls a multiplexer 78, which can remove data from a Class-VOQ 70 or a Flow-VOQ 80, within the VOQ.

In practice a VOQ may reside in one memory block, where a controller (not shown) can implement the sub-queues 70 and 80 by partitioning the large VOQ memory into several smaller virtual queues. Hence, the controllers 72 and 76 and the demultiplexer 74 and the multiplexer 78 can be 'virtual' and exist as logical abstractions, in the same memory block.

In a Best-Effort switch, these controllers 72 and 76 can use Best-Effort sub-optimal algorithms to select queues for service. For example, the queue with the largest number of packets could be selected for service. In a deterministic switch, these controllers can store optimized deterministic periodic schedules. These controllers must provide each Class-VOQ 80 with its guaranteed-rate of service, and they must provide each Flow-VOQ 70 with its guaranteed-rate of service.

The simplest VOQ can consist of one Class-VOQ and no Flow-VOQs. In this case, the VOQ is simplified since the controller 72, demultiplexer 74, the controller 76 and multiplexer 78 are not needed. This VOQ would support only 1 traffic class, and can be used in packet-switches where minimum complexity is necessary, for example an all-optical packet-switch.

Figure 3A:
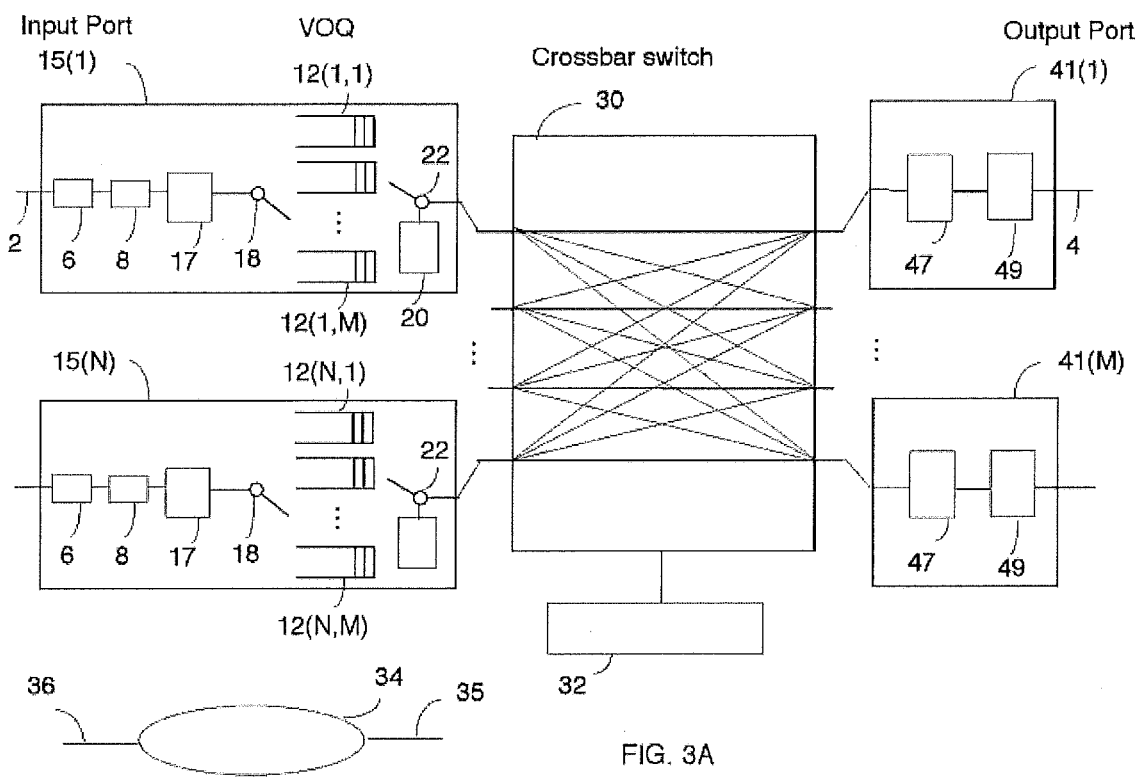
FIG. 3A shows an embodiment of a reduced-complexity IQ switch.

FIG. 3A, a Reduced-Complexity IQ Switch

FIG. 3A illustrates one embodiment of the proposed method and designs disclosed in this document, a reduced-complexity deterministic packet switch using Input Queues (IQs). A switch has N simplified input ports 15, and M simplified output ports 41. Each input port is connected to an incoming optical fiber 2. Each simplified output port 41 is connected to an outgoing fiber 4.

The switch in FIG. 3A is similar to the IQ switch in FIG. 1B, except for 2 main changes. The switch in FIG. 3A uses much simpler input ports 15, which do not require a very fast and expensive Flow-Table 16. The switch in FIG. 3A also uses a new controller 17 (which replaces the old controller 14.) This controller has internal memory (not shown) to store a deterministic schedule, which identifies the output port used by an arriving packet, based upon the packet's arrive time-slot in a scheduling frame. The controller 17 must maintain a time-slot counter internally (not shown) to count time-slots in a scheduling-frame. In a scheduling-frame with F time-slots, the time-slot counter will count from 1 to F repeatedly. The counter starts counting from 1 for each new scheduling frame. (This counter must be synchronized to the scheduling frame which contains the arriving packets. To achieve synchronization, a deterministic switch can send a 'start-of-scheduling-frame' signal at the beginning of each scheduling frame.)

In a deterministic network, the flow-label of packet which arrives at a deterministic switch at time-slot j of a Scheduling Frame, for $1<=j<=F$, is predetermined. Hence, at each input port a flow-label and a Flow-Table are not needed to select a VOQ to receive the packet. The VOQ to receive the packet is predetermined by the deterministic nature of the network. Therefore, an SDN control-plane (not shown) can configure the controller 17 with deterministic periodic schedules, which identifies the VOQ 12, and the Class-VOQ 80 or Flow-VOQ 70, to receive and buffer an incoming packet, for every time-slot in a scheduling-frame. A method to compute these schedules is described in FIG. 4 ahead. An example of a deterministic schedule for the controller 17 is shown in FIG. 9C ahead.

The Flow-Table 16 in FIG. 1A or 1B can identify up to 1 million flows in a large network. The Flow-Table 16 must be extremely fast, to supply the output port quickly before too much of the packet is received. The removal of the Flow-Table can result in a significant simplification to an optical packet switch. There is no need to process packet-headers at optical data-rates, to extract flow-labels to identify the traffic flow. There is no need to have an extremely fast or complex Flow-Table. Recall that an Internet router's data plane can use about 60% of its power to process packet-headers, and it may process billions of packet-headers per second. The reduced-complexity switch in FIG. 3A removes the need to process any packet-headers. It removes the need for a very large and very fast Flow-Table. This switch may therefore save about 60% of the power in an Internet router.

The removal of the Flow-Table 16 has two other important benefits. First, it can significantly improve the security of the Internet as well. A deterministic packet switch does not need to process any packet-headers. Therefore, an entire packet can be encrypted at the originating source node, since no deterministic switch will ever need to process its packet-header. In contrast, in the current Best-Effort internet, packet-headers are not encrypted to allow the Internet routers to process the packet-headers. Second, the arrival times of packets on links is deterministically scheduled and pre-determined. Hence, it is possible to detect an unauthorized packet from an intruder during a cyber-attack. Any packet which arrives during a time-slot for which no packet arrival is scheduled must be unauthorized and may be from an intruder. The controller 17 can detect this case, and send a message to the SDN control-plane (not shown in FIG. 3A), that a packet from an intruder has been detected. In addition, the controller 17 can count the packet arrivals for each traffic flow or traffic class in each scheduling frame. If any flow or class receives more packets than its Guaranteed-Rate allows for, then some packets must be un-authorized and may be from a cyber-attacker. The controller 17 can inform the master-controller 34, which can notify the SDN control-plane 110 of the potential cyber-attack.

Figure 3B:
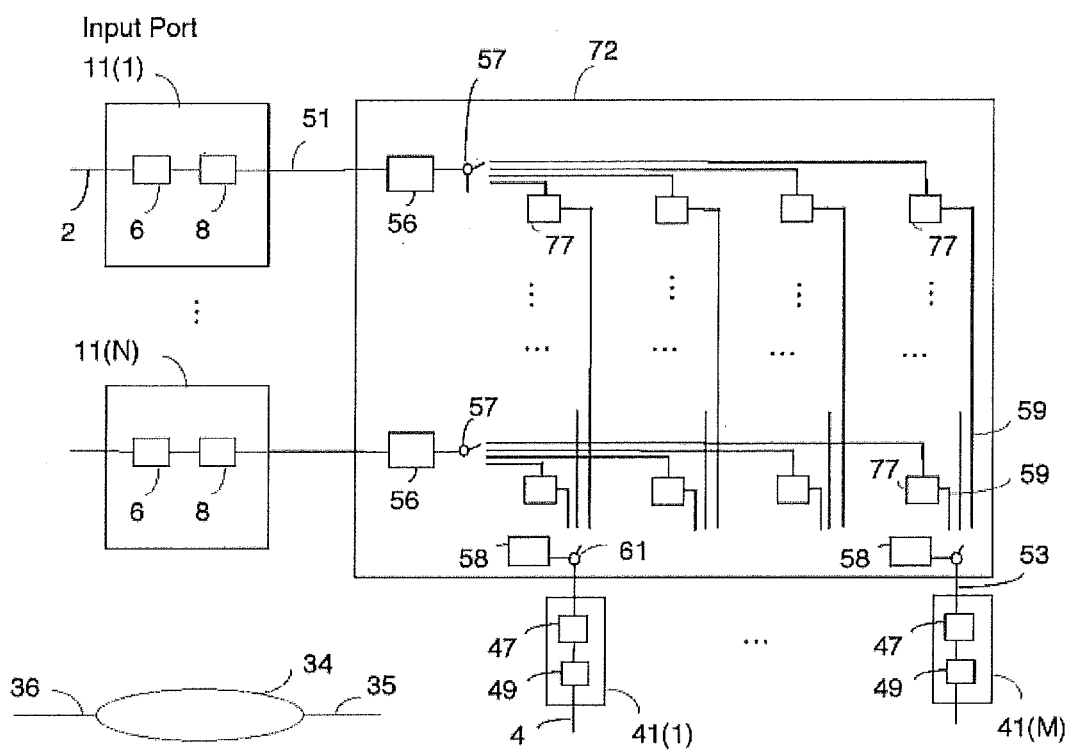
FIG. 3B shows an embodiment of a reduced-complexity XQ switch.

FIG. 3B, a Reduced-Complexity XQ Switch

FIG. 3B illustrates an embodiment of a reduced-complexity switch which uses crosspoint queues (XQs). This switch has some similarities to the CIXOQ switch in FIG. 1C, except that it is much simpler. A switch may have N simplified input ports 11, and M simplified output ports 41.

Each simplified input port 11 is connected to an incoming optical fiber 2. Each simplified output port 41 is connected to an outgoing optical fiber 4. The input port 11 has an OE receiver 6, and a packet buffer 8. The simplified output port 41 has a packet buffer 47, which can store a packet. The packet buffer sends a packet to the EO transmitter 49, which converts the packet into the optical domain and sends the packet on the outgoing fiber 4.

The input ports 11 and output ports 41 have been simplified, so that they can be combined in one or more Silicon Photonics transceiver die which do not require a significant level of design changes from industry-standard transceivers such as Ethernet transceivers. The switching matrix and master-controller can realized on an FPGA or ASIC die. These die can be interconnected and packaged on a single integrated circuit package, such as a BGA package. A BGA package is described in FIG. 10 ahead.

The simplified input ports 11 do not require any VOQs 12 or a Flow-Table 16. The complexity has shifted from the input ports 11 and moved to the switch, to keep the Silicon Photonics transceivers relatively simple. The input port 11 requires an OE receiver module 6, and a packet buffer 8. Once a packet is received, it is sent into the switch 75.

In FIG. 3B, the switch 75 has a similar structure to the switch 52 in FIG. 1C. The main difference is that the crosspoint queues 77 in the switch 72 are more complex than the simple crosspoint buffers 55 shown in FIG. 1C. The crosspoint queues 77 can use the full VOQ designs shown in FIG. 2, with Class-VOQs 80 and Flow-VOQs 70. As shown on FIG. 2, each crosspoint queue 77 in the switch 72 requires a controller 72 and demultiplexer 74 to forward data (packets or cells) into the correct Class-VOQ 80 or Flow-VOQ 70. Each crosspoint queue 77 in the switch 72 also requires a controller 76 and multiplexer 78 to select data (packets or cells) from the correct Class-VOQ 80 or Flow-VOQ 70, for transmission onto a vertical wire 59, towards an output port 41.

In the deterministic XQ switch shown in FIG. 3B, the master-controller 34 must configure all the controllers with deterministic periodic schedules, including controllers 56, 58, and 72, 76. The master-controller 34 responds to control command from the SDN control-plane 110 (not shown in FIG. 3B). These controllers 56, 58, and 72 can be controlled with 2 periodic deterministic schedules, which control the reception of packets. Hence, the switch 72 requires memory to store 2 periodic deterministic schedules. (These schedules can also be stored in one larger memory, which all controllers can access.) Since a Flow-Table 16 is not used, then the switch 72 should have a time-slot counter (not shown), which all controllers can access. (Alternatively, each controller can have its own time-slot counter.) The controller 56 will identify the VOQ which may receive and buffer a packet in each time-slot of a scheduling frame, according to a periodic schedule. The deterministic schedule in FIG. 9C is an example of such a schedule used by controller 56. The controller 56 will identify the VOQ to buffer an arriving packet, based upon the time-slot of the arriving packet in the scheduling frame, according to the schedule. The controller 72 will select a destination sub-queue, either a Class-VOQ or Flow-VOQ, to receive and buffer the packet, based upon the time-slot of the arriving packet in the scheduling frame, according to a periodic deterministic schedule. (There may be one memory which stores a schedule for all controllers 72, or the schedule may be distributed over several smaller memories, i.e., one for each controller 72.)

The controllers 58 and 76 can be controlled with 2 periodic deterministic schedules, which control the transmission of packets. Hence, the switch 72 requires memory to store these 2 periodic deterministic schedules as well. (These schedules can also be stored in one larger memory, which all controllers can access.) The controller 58 will use one transmission schedule to select a VOQ 77 to transmit, based upon the time-slot in the scheduling frame. The controller 76 will use the other transmission schedule to select a sub-queue to transmit, based upon the time-slot in the scheduling frame. Methods to compute the schedules for controllers 58 and 76 are given in reference [12], entitled "Crossbar Switch and Recursive Scheduling", U.S. Pat. No. 8,503,440 B2, Aug. 6, 2013. There may be one memory which stores one transmission schedule for all controllers 58, or this schedule may be distributed over several smaller memories, i.e., one for each controller 58. Similarly, there may be one memory which stores the one transmission schedule for all controllers 76, or this schedule may be distributed several smaller memories, i.e., one for each controller 76.

In addition, the controller 56 may have a counter which counts the time-slots in a scheduling frame. The controller 56 can count the number of packet arrivals for each traffic flow or traffic class in each scheduling frame. (If a scheduling frame has F time-slots, then this controller can count the packet arrives over any sequence of F consecutive time-slots, which can be viewed as a scheduling frame.) If any flow or class receives more packets than its Guaranteed-Rate allows for, then some packets must be un-authorized and may be from a cyber-attacker. The controller 56 can also verify that no packets arrive in a time-slot for which no arrivals were scheduled. If a packet arrives in a time-slot for which no arrival was scheduled, the packet is unauthorized and may be from a cyber-attacker. The controller 56 can inform the master-controller 34, which can notify the SDN control-plane 110 of the potential cyber-attack. (The controller 56 will need a time-slot counter, which is synchronized with the start of a scheduling frame in which packets arrive on an input-port. Each deterministic packet switch can send a 'start-of-scheduling-frame' signal at the beginning of each scheduling frame when it transmits packets, which a receiving packet switch can synchronize too.)

Figure 3C:
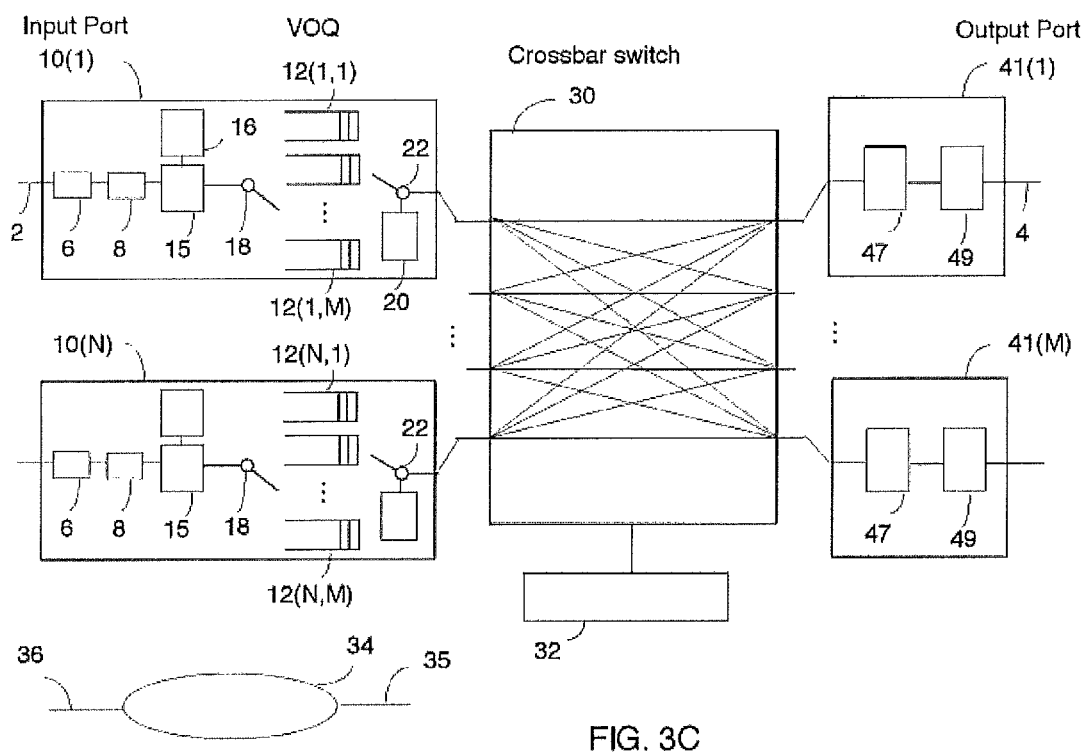
FIG. 3C shows another embodiment of a reduced-complexity IQ switch.

FIG. 3C, a Reduced-Complexity IQ Switch

FIG. 3C illustrates another embodiment a reduced-complexity deterministic switch using Input Queues (IQs). A switch has N input ports 10, and M simplified output ports 41. Each input port 10 is connected to an incoming optical fiber 2. Each simplified output port 41 is connected to an outgoing fiber 4.

The switch in FIG. 3C is similar to the IQ switch in FIG. 1B, except for one significant change. The switch in FIG. 3C adds new functionality to the input port 10 and uses a new controller 15. The input port uses a Flow-Table 16. When a packet arrives, its flow-label is extracted and used to access the Flow-Table 16. The Flow-table identifies the VOQ to receive and buffer the packet, and the Flow-VOQ or Class-VOQ within the VOQ, to receive and buffer the packet. The controller 15 can maintain a time-slot counter internally (not shown) to count time-slots in a scheduling-frame. In a scheduling-frame with F time-slots, the time-slot counter will count from 1 to F repeatedly. (The counter can count packet arrivals over any sequence of F time-slots, which can be viewed as a scheduling frame. This scheme reduces complexity, by avoiding the need for synchronization to the actual scheduling frame which contains arriving packets.) The controller can count the number of packet arrivals for each traffic flow or traffic class, which arrive on the input port per scheduling frame. If too many packets arrive in one scheduling frame, above the Guaranteed-Rate reserved for the traffic flow or traffic class, then an error has occurred. The extra packets are unauthorized, and may be from a cyber-attacker. The controller 15 can inform the master-controller 34, which can send a message to the SDN control-plane 110 (not shown) to inform it of the potential cyber-attack.

Figure 3D:
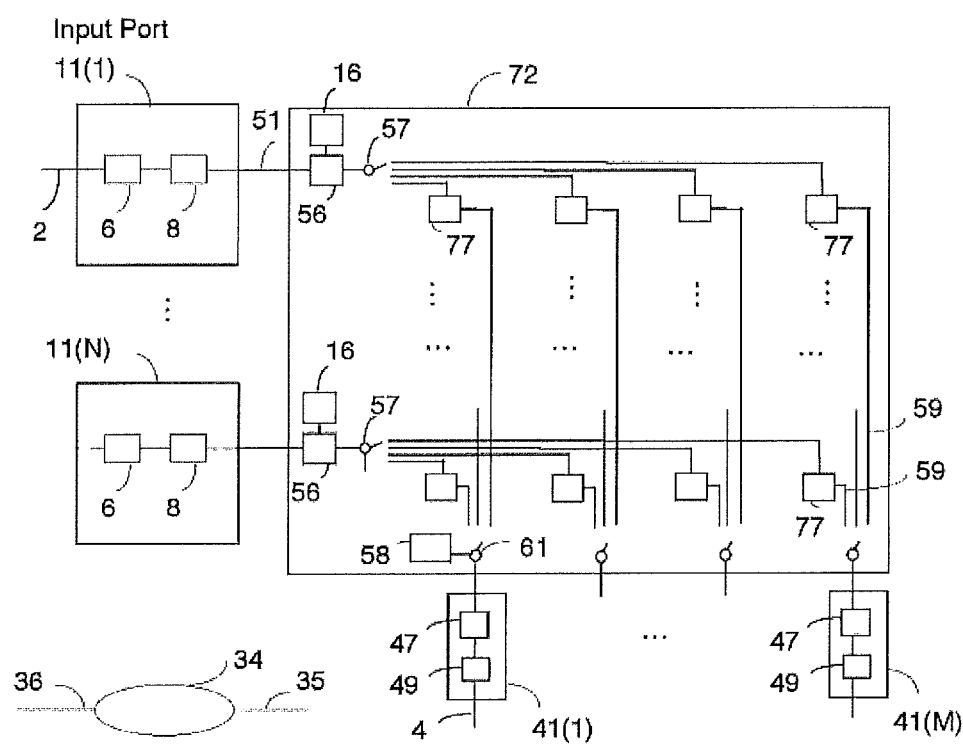
FIG. 3D shows another embodiment of a reduced-complexity XQ switch.

FIG. 3D, a Reduced-Complexity XQ Switch

FIG. 3D illustrates another embodiment a reduced-complexity deterministic switch using Crosspoint Queues (XQs). A switch has N simplified input ports 11, and M simplified output ports 41. Each input port 11 is connected to an incoming optical fiber 2. Each simplified output port 41 is connected to an outgoing fiber 4.

The switch in FIG. 3D is similar to the XQ switch in FIG. 3B, except for 2 main changes. The controller 56 has access to a Flow-Table 16. When a packet arrives, its flow-label is extracted and used to access the Flow-Table. The Flow-table identifies the VOQ to receive and buffer the packet, and the Flow-VOQ or Class-VOQ within the VOQ, to receive and buffer the packet.

The controller 56 has new functionality to detect cyber-attacks. The controller 56 can maintain a time-slot counter internally (not shown) to count time-slots in a scheduling-frame. In a scheduling-frame with F time-slots, the time-slot counter will count from 1 to F repeatedly The controller 56 can count the number of packet arrivals for each traffic flow or traffic class, which arrive on the input port, per scheduling frame. (The counter can count packet arrivals over any sequence of F time-slots, which can be viewed as a scheduling frame. This scheme reduces complexity, by avoiding the need for synchronization to the actual scheduling frame which contains arriving packets.) If too many packets arrive in one scheduling frame, above the Guaranteed-Rate reserved for the traffic flow or traffic class, then an error has occurred. The extra packets are unauthorized, and may be from a cyber-attacker. The controller 56 can inform the master-controller 34, which can send a message to the SDN control-plane 110 (not shown) to inform it of the potential cyber-attack.

FIG. 4, a Method to Eliminate Packet-Header Processing

FIG. 4 illustrates a method which can be performed in the SDN control-plane 110, to eliminate the need to process packet-headers in packet-switches. (An SDN control-plane is described in FIG. 6B ahead.) It would be impossible for a switch, in isolation, to eliminate the need to process packet-headers since it does not have enough information.

The following notation will be used in FIG. 4. The variable s will denote a switch, with range 1<=s<=S. Let every switch have N input ports and M output ports. The variable j will denote an input port, with range 1<=j<=N. The variable k will denote an output port, with range 1<=k<=M. The variable f will denote a traffic flow, with range 1<=f<=G. (For the purpose of scheduling, a traffic class with a guaranteed-rate is treated as another traffic flow with a guaranteed-rate.) The variable F will denote the length of a scheduling-frame, in time-slots.

FIG. 4 illustrates a method which can be performed in the SDN control-plane 110, to eliminate the need to process packet-headers in packet-switches, and to eliminate the need for an extremely fast Flow-Table 16. The switch may be aware of the traffic rate matrix of guaranteed data-rates between its input and output ports to schedule. However, the traffic rate matrix is not enough information to enable a switch to eliminate the need to process packet-headers.

However, when an SDN control-plane 110 is introduced, the SDN control-plane has a global view of the network. The SDN control-plane has sufficient knowledge to determine which traffic flows will be transmitted in each time-slot of a scheduling frame, for every output port at every deterministic switch. The SDN control-plane can therefore pre-compute several schedules for each switch, and send the schedules to each switch.

In box 502, the SDN control-plane will route every GR traffic flow along a fixed path in the network, from a source node to a destination node. The fixed path traverses several switches. The routing process must ensure that no bandwidth capacity constraints at any input port and any output port (or any link) are violated. This step yields 2 matrices A(f,s) and D(f,s). In each switch s, the flow arrives at a fixed input port j=A(f,s), and departs on a fixed output port k=D(f,s). Every flow has a guaranteed data-rate to be satisfied, which is stored in the vector GR(f).

In box 504, the SDN control-plane can determine a traffic rate matrix T(j,k) for each switch s. This step yields a 3D array T(j,k,s). For every flow f that traverses switch s, its guaranteed rate GR(f) is added to element T(j,k,s), where j=A(f,s) and k=D(f,s).

In box 506, for each switch s, a list of traffic flows which depart on output port k is determined, from the routing information in box 502. A list of traffic flows which arrive on input port j can also determined, from the routing information in box 502.

In box 508, for every switch s the traffic rate matrix is scheduled. Scheduling algorithms for a CIOQ switch are given in [10], "Method and Apparatus to Schedule Packets Through a Crossbar Switch with Delay Guarantees", U.S. Pat. No. 8,089,959 B2, Jan. 3, 2012, and in [9], "Method to Achieve Bounded Buffer Sizes and Quality of Service Guarantees in the Internet Network", U.S. Pat. No. 8,665,722, March 2014, and in [12], "Crossbar Switch and Recursive Scheduling", U.S. Pat. No. 8,503,440 B2, Aug. 6, 2013.

In the SDN control-plane, this scheduling yields a 3D array A(j,t,s), where k=A(j,t,s) yields the output port k that a VOQ(j,k) associated with input port j will transmit to, in time-slot t of switch s. For a CIOQ switch s, the matrix A(j,t) yields a first schedule, which maps input ports onto output ports, in each time-slot. (In this notation, the value s has been fixed, to identify a 2D matrix for switch s). Equivalently, k=A(j,t) determines which VOQ at input port j can transmit in switch s, in each time-slot of a scheduling frame. This first schedule provides each VOQ with its guaranteed rate of transmission.

In a CIXQ switch s, a schedule A(k,t) is generated, where j=A(k,t) identifies the VOQ(j,k) which is enabled to transmit to output port k, in each time-slot t of a scheduling-frame. This schedule provides each VOQ (crosspoint queue) with its guaranteed rate of transmission. In the SDN control-plane, this matrix for switch s can be stored in a 3D array A(k,t,s).

Note that a switch s can also compute its own matrix A(j,t) in box 508, if the SDN control-plane sends the traffic matrix T(:,:,s) to said switch s. (In this notation, s is fixed, yielding a matrix T with N rows and M columns, which applies to switch s).

In box 510, the traffic flows are scheduled for transmission on each output link k, in each switch s. The guaranteed-rate service each VOQ receives in box 508 is allocated to the traffic flows buffered within said VOQ. Scheduling algorithms to schedule traffic flows are given in [10], "Method to Achieve Bounded Buffer Sizes and Quality of Service Guarantees in the Internet Network", U.S. Pat. No. 8,665,722, March 2014, and in [13], "Method to Schedule Multiple Traffic Flows Through Packet-Switched Routers with Near Minimal Queue Sizes", U.S. Pat. No. 8,681,609 B2, Mar. 25, 2014.

For the purposes of scheduling, a traffic class with a guaranteed rate is treated as a traffic flow with a guaranteed rate, in this step. In a CIOQ switch s, this step yields an matrix P(j,t), where f=P(j,t) yields the traffic flow (or traffic class) f which receives service, if any, at input port j of said switch at time-slot t. In the SDN control-plane, this matrix for switch s can be stored in a 3D array P(j,t,s). (In a CIXQ switch s, this step yields a matrix P(k,t), where f=P(k,t) yields the traffic flow or traffic class which receives service at output port k, at time-slot t at switch s. In the SDN control-plane, this matrix can be stored in a 3D array P(k,t,s).)

In box 510, the SDN control-plane already knows, for every switch s, the list of flows which depart on each output link k, in each time-slot of a scheduling frame, as these were computed in box 502. This step also yields an array Q(k,t,s), where f=Q(k,t,s) yields the traffic flow, if any, which departs on output link k, at time-slot t, in switch s. When a VOQ(j,k) in switch s receives service in a time-slot t (determined from the schedule A) and selects flow f to transmit (determined from the schedule P), then Q(k,t,s) is assigned the value f (an idle time-slot is denoted with a 0).

(In box 510, a switch s can also schedule its own flows and compute the matrix Q, if it is has the matrices A and P, the list of flows traversing said switch, the output ports used by said flows, and the guaranteed rates of said flows.)

In box 512, for each switch s and for each output port k, said switch s can send a vector on the output port k to a receiving switch s*. The vector is Q(k,:,s). (In this notation, the value of k is fixed, the value of s is fixed, and the variable t can vary from 1 to F, yielding a vector of F elements.) This vector identifies the traffic flows which will arrive at each time-slot in a scheduling frame, at the receiving input port j of the receiving switch s*. Each switch s* will now know the precise arrival time-slots of traffic flows on its incoming port. (The SDN control-plane can also send the vector to each receiving switch s*, rather than the switch s.)

In box 514, for each switch s and each input port j, said switch s will receive a vector from a sending switch s* on its input port j. Call this vector Q(1,t). (This notation represents 1 row, with F columns.) This vector can be placed into row j of a matrix Q(j,t). f=Q(j,t) identifies the traffic flow which will arrive at time-slot t in a scheduling frame, at said input port j, at said switch s. This matrix Q(j,t) represents a third schedule, which identifies the traffic flow received in each time-slot of a scheduling frame, at each input port j, at switch s. In the SDN control-plane, this matrix can be written into a 3D array Q(j,t,s), where Q(j,t,s)=f yields the traffic flow f which will arrive at time-slot t at input port j of switch s.

In box 516, in each switch s, and each input port j, a new vector Y(1,t) is generated, which identifies the output ports needed by the traffic flows which arrive on input port j of said switch s, for every time-slot t in a scheduling frame. This vector can be placed into row j of a matrix Y(j,t). The flow f=Q(j,t) will arrive at said switch s on input port j, at time-slot t. The output port used by this flow in this switch is given by k=D(f,s) (see box 502). This value is written into the new vector Y(j,t). This vector Y represents a fourth schedule, which will remove the need to process packet-headers. For example, at input port j of switch s, every packet which arrives at time-slot t will be routed to output port k=Y(j,t), and this information identifies the VOQ(j,k) to receive said packet. In the SDN control-plane, this matrix can be written into a 3D array Y(j,t,s), where k=Y(j,t,s) yields the output port k, to be used by a packet which will arrive at time-slot t, at input port j of switch s.

By performing this method, every switch can receive 2 schedules, which will remove the need to process any packet-headers on the packets arriving from other switches.

Figure 6A:
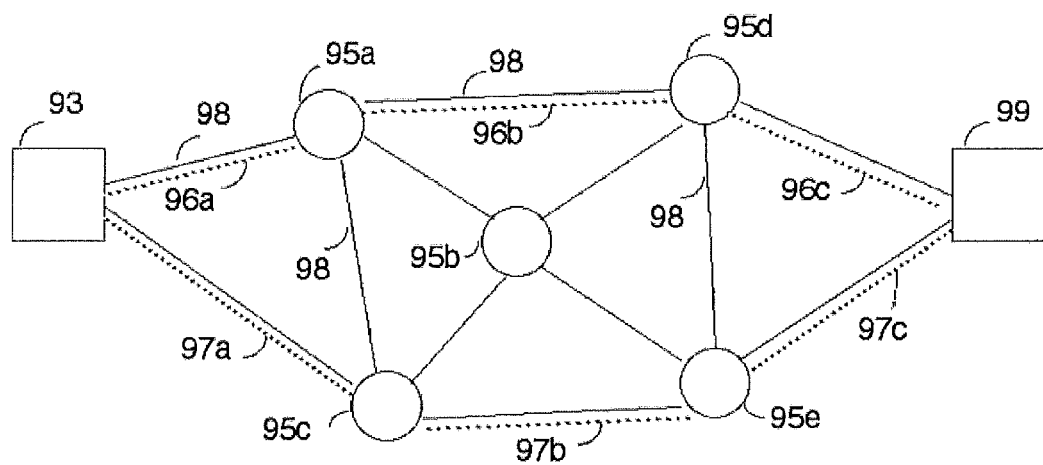
FIG. 6A illustrates a network of switches and routers, which operates at layer 3.
Figure 6B:
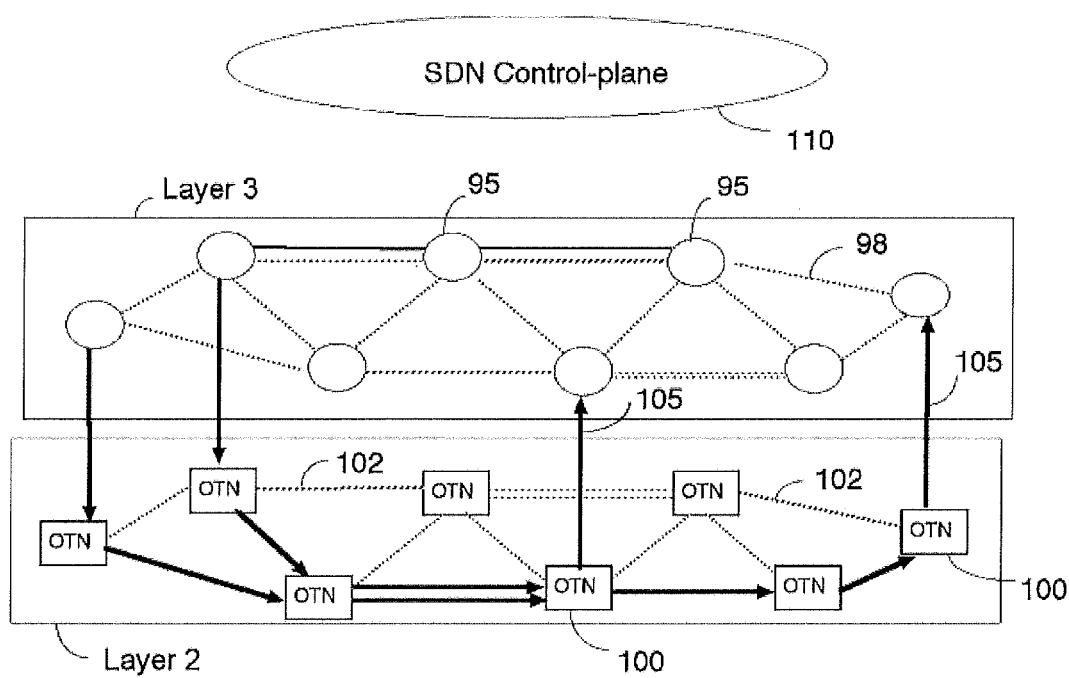
FIG. 6B illustrates a network of switches and routers, which operates at both layers 3 and 2.

Traffic sources 93 are distinct from switches 95, as illustrated in FIG. 6A ahead. To remove the need to process packet-headers on the packets arriving from a traffic source 93 (rather than a deterministic switch 95), the SDN control-plane 110 can allocate for each source 93 a guaranteed-rate of transmission, and it can allocate the time-slots within a scheduling frame, in which the source 93 is allowed to transmit. (A low-jitter allocation of time-slots is preferred. (Low-jitter schedules are described in FIG. 11 ahead.) The source 93 can then transmit its packets in the allocated time-slots of a scheduling-frame. To eliminate the use of packet-header processing in a receiving switch, a source 93 must send a 'start-of-scheduling-frame' pattern at the beginning of each scheduling frame, so that a receiving switch can count the time-slots. Similarly, every deterministic switch which transmits data on an output port must send a 'start-of-scheduling-frame' signal to denote the beginning of a scheduling frame, so that the receiving switches can count the time-slots.

FIG. 5, Packet Formats

Packets can have many formats, including the Ethernet, Infiniband, FiberChannel, ATM, MPLS, IPv4 or IPv6 packet formats, or any other packet format.

FIG. 5A shows an 802.3 Ethernet packet. A traffic flow can be identified by the MAC source and destination addresses (48 bits each). The payload can vary between about 46 and about 1500 bytes. (When 802.1Q virtual LAN technology is used, 4 bytes are used to identify the virtual LANs, and the minimum payload is 42 bytes.) The basic Ethernet packet includes an initial preamble of 7 bytes, a 'start-of-frame' delimiter which identifies packet boundaries, a Media Access Control (MAC) destination address with 48 bits, a MAC source address with 48 bits, an optional tag, an Ethernet type field, the payload, a frame check sequence for error detection, and a final interpacket gap. One variant of the basic Ethernet is the Deterministic Ethernet standard, where 3 bytes are used to identify a Virtual Network.

FIG. 5B illustrates the IPv4 packet format. The packet header can consume 24 bytes. A traffic flow can be identified from the source and destination IP addresses (32 bits each), and the protocol version number.

FIG. 5C illustrates the IPv6 fixed packet-header format. The packet-header can consume 40 bytes. A traffic flow can be identified from a 20 bit flow-label. IPv6 packets can be very large, up to 64K bytes (and even larger).

FIG. 6, Networks in Layer-3 and Layer-2.

FIGS. 6A and 6B illustrate a network composed of multiple packet-switches. A network can be viewed at several layers. The Internet Protocol operates at layer 3, and the nodes in a layer-3 network are Internet routers. By definition, layer 3 nodes such as Internet routers make routing decisions when they send packets forward. By definition, layer 2 nodes do not make routing decisions when they send packets forward.

In FIG. 6A, many Internet routers 95 can be interconnected with directed optical transmission links 98 to form an Internet Protocol network. The optical links 98 transmit layer-3 packets, such as IPv4 or IPv6 packets. The network may support many end-to-end traffic flows, each from a source node 93 to a destination node 99 in the network. An end-to-end flow can follow a layer-3 path from the source 93 to the destination 99. The edges 98a, 98b and 98c form a layer-3 path from the source 93 to the destination 99. The edges 98d, 98e and 98f form another layer-3 path from the source 93 to the destination 99.

FIGS. 6A and 6B also show one embodiment of our proposed methods and hardware design, consisting of a layer-2 deterministic 'Optical Transport Network' consisting of integrated deterministic optical packet-switches 100 and directed optical links 102 between the optical packet-switches 100. (The bold lines represent established deterministic connections. The dotted lines in FIGS. 6A and 6B represent optical links 102.) The proposed integrated deterministic optical packet-switches can operate in layer 2, and they are much simpler than IP routers which operate in layer 3, since they are not responsible for making routing decisions.

Using the methods and design techniques presented in this patent application, in one embodiment the reduced-complexity deterministic optical packet-switches 100 in layer 2 can be built on a single integrated circuit package, using Silicon Photonics transceivers. The proposed deterministic switch designs can reduce Internet router buffer sizes by a factor of potentially 100,000 to 1,000,000 times, and can eliminate the need to process packet-headers, thereby enabling a practical switch to be realized on a single integrated package. The switch can also detect unauthorized packets from a cyber-attacker.

The proposed layer 2 network is oriented to the efficient transportation of data with exceptionally low latencies. Many deterministic traffic flows can traverse several switches in the layer 2 network, thereby bypassing several more complex Internet routers in layer 3, which significantly reduces delay and energy. In FIG. 6B, the bold lines represent deterministic connections which bypass several routers in layer 3. Layer-3 Internet routers can incur delays of 10s to 100s of milliseconds. These delays are avoided in the proposed deterministic layer 2 network. According to the paper [7], entitled "Securing the Industrial-Tactile Internet of Things with Deterministic Silicon Photonics Switches", IEEE Access Magazine, September 2016, the use of deterministic layer 2 integrated optical switches can reduce the energy used by a factor of 100 to 1000 times, compared to a layer 3 Internet router.

The integrated optical packet switches can also transport large packets, since they focus on the efficient transport of data. For example, the layer 2 network could use a layer 2 packet size of 16 Kbytes or 64 Kbytes. Each layer 2 packet could contain 1 or more smaller Internet Protocol packets from layer 3, which would need to be placed within a layer 2 packet. Each layer 2 packet could also contain a fraction of a very large IPv6 packet with more than 64 Kbytes.

The layer 3 Internet Protocol network may support multiple traffic classes, where each link 98 or 102 can transmit packets belonging to multiple traffic classes. The IETF's Differentiated Services traffic model supports 3 prioritized traffic classes, called 'Expedited Forwarding' (EF), the 'Assured Forwarding' AF, and the Default (DE) traffic classes. A new class can be added to support Deterministic traffic flows, each with a Guaranteed-Rate of transmission. All these traffic classes can be supported in a layer 2 integrated deterministic optical packet-switch.

FIG. 6B also illustrates a Software Defined Networking (SDN) control-plane 110. SDN refers to a type of network where a logical SDN control-plane 110 (also called an SDN control-plane) exists, to control the switches or routers in a network. The SDN control-plane 110 can control each switch or router 95 in a layer-3 network, typically by sending control packets over the network to each switch. Similarly, the SDN control-plane 110 can control each switch 100 in a layer-2 Optical Transport Network, typically by sending control packets over the network to each layer 2 switch 100. In our embodiment of a deterministic layer 2 network as shown in FIG. 6B, the control packets can instruct a layer-2 deterministic switch 100 to configure its controllers with several deterministic periodic schedules. The logical SDN control-plane 110 can exist as a single software program at one location, or it can consist of several software programs which are distributed over multiple locations, which communicate with each other.

For example, the SDN control-plane 110 can receive a request for a connection to be established between 2 nodes (i.e., 2 cities) with a Guaranteed-Rate. The control-plane 110 can route a deterministic traffic flow along an end-to-end path through the layer 2 OTN to satisfy the request, such that no capacity constraints are violated. The SDN control-plane 110 can then send control packets to the packet-switches along the end-to-end path, to configure the switches to support the deterministic traffic flow. For example, the SDN control-plane can program the Flow-Table memory 16 at each switch or router 95 along the end-to-end path, to inform the switch that a new deterministic traffic flow with a specific flow-label will arrive at that switch at a specific input port. The switch will forward the packets of this flow to the correct output port, and it may exchange the original label with a new label (if instructed by the Flow-Table). The SDN control-plane 110 may also send control packets instructing the switch to configure the deterministic periodic schedules at each switch along the end-to-end path. The SDN control-plane 110 can compute the schedules and send them to each switch, as described in FIG. 4. Alternatively, the SDN control-plane 110 can send a traffic rate matrix to each switch along the end-to-end path, as also described in FIG. 4. A traffic rate matrix is shown in FIG. 7 ahead. A traffic matrix specifies the guaranteed data rates which must be supported between the input ports and output ports for each switch.

FIG. 7, the Guaranteed-Rate Traffic Matrix

FIG. 7 illustrates a traffic rate matrix T 200. A switch with N input ports and M output ports can have a N×M matrix called T 200 of guaranteed rates (GR) of traffic, to be supported between its N input and M output ports. In a discrete-time switch, each matrix element T(i,j) 202 can be expressed as a number of time-slot reservations required between input port i and output port j, in a scheduling frame of F time-slots. Consider a network of discrete-time switches, where a scheduling frame has F time-slots. To be a valid matrix, two constraints must be met: (1) The sum of GR demands by each input port j must be less than F, i.e., the sum of row j of the matrix must be <=F. (2) The sum of bandwidths demands for each output port k must be less than F, i.e., the sum of column k of the matrix must be <=F. (The periodic schedules can be re-used as long as the traffic rate matrix does not change. When the traffic rate matrix changes, the schedules must be recomputed.)

FIG. 8, an All-Optical Packet Switch

Figure 8A:
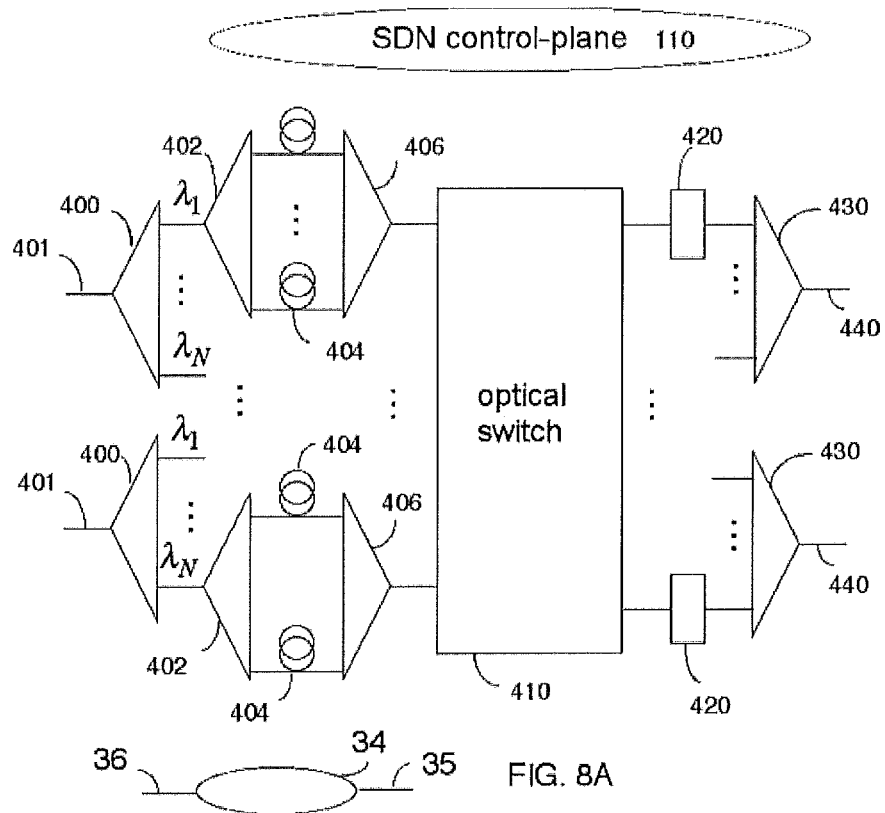
FIG. 8A illustrates an embodiment of an all-optical packet switch.

FIG. 8A shows one embodiment of the invention, an all-optical packet switch. FIG. 8A shows the optical pathways through the network, without showing the controllers. The switch interconnects incoming fibers 401 and outgoing fibers 440. The switch contains optical demultiplexers 400, controllable optical demultiplexers 402, optical buffers 404, controllable optical multiplexers 406, an all-optical switch 410, wavelength converters 420, and optical multiplexers 430. Each switch has a master-controller 34, which receives commands from an SDN control-plane 110.

Due to the significant reduction in complexity due to the proposed invention, the all-optical switch in FIG. 8A can also be realized on an integrated Silicon-Photonics integrated circuit. An SDN control-plane 110 can control the master-controller 34 associated with each switch, to support deterministic end-to-end connections in a deterministic or Guaranteed-Rate all-optical layer 2 network.

Packets arrive on incoming fibers 401, on multiple wavelengths. In a discrete-time switch, the time-axis can be divided into scheduling frames each consisting of F packet time-slots. Each incoming optical packet must be scheduled for transmission in one packet time-slot on an outgoing fiber 440 and outgoing wavelength. The use of Guaranteed-Rate connections greatly simplifies the operation of the all-optical switch, as a result of the deterministic TDM-based periodic schedules: (1) Packets arrive to each switch at deterministic times according to a periodic schedule for each fiber, (2) Each packet will be buffered for a small number of time-slots (if any); (3) Packets will depart each switch at deterministic times according to a periodic schedule for each fiber. The method in FIG. 4 illustrates how the SDN control-plane 110 can compute deterministic schedules for an all-optical switch.

The SDN control-plane 110 configures the electronic controllers, which control the optical-components to perform the switching: The optical demultiplexers 402 are activated to forward packets into optical buffers 404 at the correct time-slots. The optical multiplexers 406 are activated to forward packets from optical buffers 404, through the optical switch 410 to the wavelength converters 420, and onto the an outgoing fiber 440, in the correct time-slots. The optical switch is activated to perform the periodic schedules described earlier. There is a first periodic schedule to control the de-multiplexers 402, to assign optical packets to optical buffers 404. There is a second periodic schedule to control the optical buffers 404, to control how long each packet is buffered for. There is a third period schedule to control the optical multiplexers 406, to select a packet for transmission through the switch. There is a fourth periodic schedule to control the wavelength converters 418 before the optical switch. The desired output port is reached by adjusting the wavelength of the packet transmission, before the packet enters the packet switch. The switch can route packets to an output port based upon the wavelength of the packet. There is a fifth periodic schedule, to control the wavelength converters 420 after the optical switch. These converters assign the packet to a final wavelength for long distance transmission.

In one embodiment of the proposed invention, an integrated single-chip all-optical packet switch can be realized using the Silicon-Photonics technology. This technology allows for the integration of CMOS logic along with optical waveguides, optical wavelength converters, and optical binary switches, all in the same integrated circuit. The optical packet buffers in FIG. 8A or 8B can use a small number of fiber delay loops, which could be external to the integrated circuit package. It would be impossible to implement a regular Best-Effort Internet router on a single chip, simply due to the vast amount of buffering required, and the vast amount of packet-header processing needed. However, by using a reduced-complexity deterministic switch with deterministic periodic schedules, the amount of buffering is reduced by factor of potentially 100,000 to 1,000,000 times, thus enabling a reduced complexity deterministic optical packet switch to be fabricated on one integrated circuit package. The reduced-complexity deterministic switch also eliminates the need to process packet-headers at optical rates, and it eliminates the need for a very large and extremely fast Flow-Table 16. When using the Silicon Photonics technology, the packet buffers in FIGS. 8A and 8B can also be implemented in CMOS memory, as the Silicon-Photonics technology integrates all-optical components and CMOS logic together, and allows for the fast conversion between the electrical and optical domains.

Figure 8B:
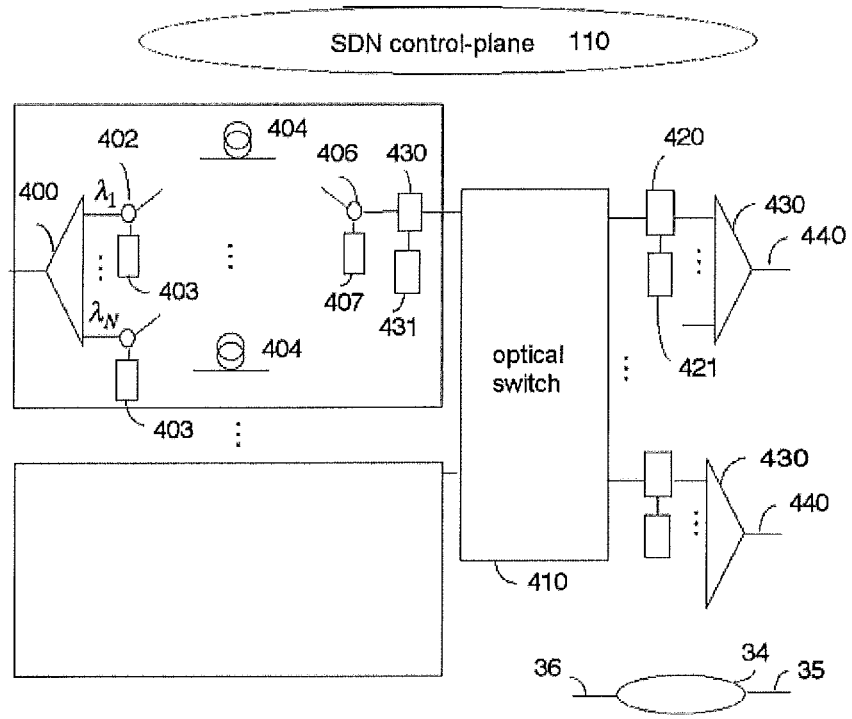
FIG. 8B illustrates another embodiment of an all-optical packet switch.

FIG. 8B shows controllers 403 to control the optical demultiplexers 402. It also shows controllers 407 to control optical multiplexers 406. It also adds wavelength converters 420 before the switch, and their controllers 421, so that a connection can be established to an output port by converting the wavelength appropriately. Switch 410 can be a wavelength-routed switch, where a connection can be established to an output port by transmitting on an appropriate wavelength.

The master-controller 34 can also monitor the packet arrivals to detect unauthorized packets from a cyber-attacker, and inform the SDN control-plane 110. If any GR traffic flow receives too many packets per scheduling frame, some packets must be unauthorized and may be from a cyber-attacker. If any packet arrives in a time-slot for which no arrival is scheduled, then the packet must be unauthorized and may be from a cyber-attacker. The master controller 34 could then inform the SDN control-plane 110 of a potential cyber-attack.

FIG. 9, the Flow Table

FIG. 9 illustrates an embodiment for a Flow-Table for the proposed deterministic packet switches, as shown in an input port 12 of the switch in FIG. 1A. Let each traffic flow arriving on a link be identified by a flow-label number. This incoming flow-label is used to read the Flow-Table 16, as shown in FIG. 1A. The Flow-Table 16 will identify the desired output port and hence the VOQ to store the packet. Each packet can maintain a stack of labels, with one label initially. When flows are aggregated, a new label can be pushed onto the stack, to identify the aggregated flow. When flows are dis-aggregated, a flow-label is popped off the stack, leaving each flow with its original label. (The most recently added flow-label takes precedence.)

In the table in FIG. 9A, each row represents one traffic flow with a distinct flow-label. There are multiple columns for each flow. The column LABEL-IN identifies the label on an incoming packet, the column LABEL-OUT identifies the label to be inserted on an outgoing packet, the column OP-PORT identifies the outgoing output port 14 that this packet will use, and the column RATE identifies the Guaranteed-Rate of the traffic flow. In this example, the Guaranteed-Rate is expressed as a number of time-slot reservations per scheduling frame of length F time-slots. Let each packet have a label-stack, with at least 1 label. The column SWAP contains a number, where 0 indicates to swap the label in the packet header, where 1 indicates to push a new label onto the packet label-stack, and where 2 indicates to pop the label off the packet label-stack. The value 3 indicates to pop the label off the stack, and to swap the older label with a new label. These four operations allow the SDN control-plane 110 to aggregate multiple deterministic traffic flows arriving at a switch, into a new flow with a new deterministic rate and a new flow-label (the older flow-label is retained in the packet flow-label stack but remains unused, as a new label has been pushed onto the label stack and it takes precedence). These operations also allow the SDN control-plane 110 to dis-aggregate one deterministic flow arriving at a switch into multiple deterministic traffic flows, by removing the flow-label for the aggregated flow, and replacing it by the original flow-labels of the flows which were aggregated.

In the table in FIG. 9A, three traffic flows with incoming labels 27, 130 and 94 will all be buffered in the same VOQ 12, since they will exit on a common output port with label 1. Without any aggregation, each traffic flow is treated as an independent traffic flow, and has its own Flow-VOQ 70 in the VOQ as shown in FIG. 2. Each flow can have its label swapped with a new label, as indicated in the fifth column.

With aggregation, all 3 traffic flows with incoming labels 27, 130 and 94 can be aggregated into one new deterministic flow that leaves this switch. In FIG. 9B, all three traffic flows are assigned the same outgoing label, 103, which is pushed onto the packet label-stack (the old label is retained in the packet label-stack, but remains unused). In the following switches, the aggregated traffic flow with incoming label 103 is treated as one logical flow with Guaranteed-Rate 45+25+35=105. In the following switches, the aggregated traffic flow will use one Flow-VOQ 70, and the aggregated traffic flow can be scheduled as one flow with a higher rate of 105 time-slot reservations per scheduling frame.

Traffic aggregation can happen hierarchically, so that traffic flows can be aggregated to several times, as desired by the network operator. Therefore, in a layer 2 or layer 3 network, a very large number of un-aggregated traffic flows between the same pair of cities can be aggregated into relatively small number of highly-aggregated traffic flows between the pair of cities, to reduce the number of Flow-VOQs 70 used in a switch, to support scalability.

The proposed method in FIG. 4 can be used to avoid processing packet-headers, In this case, the Flow-Table in FIG. 9A can be eliminated, and a new deterministic schedule can be created with the same information, as shown in FIG. 9C. The new deterministic schedule can have F rows, where each row corresponds to one time-slot in a scheduling frame with F time-slots. A deterministic schedule is shown in FIG.

9C. Each row corresponds to a time-slot in a scheduling frame, with F=1,024 time-slots. If a packet arrives at time-slot t, for 1<=t<=F, then row t will specify the incoming label of the flow, the outgoing label, the desired output port, the Guaranteed-Rate, and the action to take. If no arrival is scheduled, the label-in value is 0. In FIG. 9C, packets arrive in time-slots 1, 3, 512 and 1,024. The desired output port is read from the deterministic schedule, which also determines the VOQ to store the packet.

Using the deterministic schedule in FIG. 9C, it is possible for a controller to detect the arrivals of unauthorized packets. Any packet which arrives in a time-slot for which no arrival is scheduled, must be unauthorized and may be from a cyber-attacker. When a packet arrives in a time-slot, the schedule in FIG. 9C indicates if an arrival was scheduled for said time-slot. The schedule also indicates the incoming flow-label which should be present in the arriving packet. A controller can compare the flow-label in the packet, with the flow-table in the deterministic schedule, to ensure that they match. If any error is detected, a controller (not shown in FIG. 9C) can inform the SDN control-plane (not shown in FIG. 9C) of the errors, which may indicate a cyber-attack.

FIG. 9, an Integrated Circuit Package with Many Die

A 'Field Programmable Gate Array' (FPGA) is a CMOS integrated circuit, where the functionality can be programmed dynamically in the field by using Computer Aided Design (CAD) tools. Current FPGAs can contain up to a few million programmable logic gates, a few hundred megabits of high speed memory, and can reach computational performances of several Teraflops per second (for single-precision floating-point arithmetic). Given their extreme flexibility, FPGAs are produced in quantities of millions with very low costs. Unfortunately, the impressive on-chip performance of FPGAs is severely limited by the inability to move vast amounts of data onto and off the chip easily.

The electrical IO bandwidth of FPGAs is currently limited to a few Tbps, using high-power electronic IO signalling technologies which can consume up to 80 W of power. For example, using a BGA integrated circuit package, an FPGA may have about 1,000 high-speed differential electronic wires operating at a few GHz, to provide a few Tbps of Input-Output (IO) bandwidth.

The integration of electrical FPGAs or ASICs with optical IO technologies represents a viable low-cost method to introduce optical technologies into the communications and computing industry. FPGAs which are integrated with low-cost Silicon Photonics transceivers in principle could provide many Tbps of optical IO bandwidth, and such devices may be available within a decade. Hence, a generic FPGA device which is integrated with multiple Silicon Photonics transceivers (i.e., Ethernet transceivers) might be available within a decade. The proposed method and design disclosed in this document result in a vast reduction in the complexity of optical packet switches, with buffer size reductions by a factor of potentially 100,000 to 1,000,000 times. The proposed invention also can remove the need to process potentially billions of packet headers per second, and can improve cyber-security. In another embodiment of the proposed invention, a reduced-complexity deterministic packet switch can be implemented on an integrated photonic package, comprising Silicon Photonics transceivers and an FPGA or ASIC die.

As another embodiment of the proposed invention, it is possible to integrate a die containing laser diode transmitter arrays, and another die containing photo-detector arrays, along with an FPGA or ASIC, onto a single integrated circuit package which realizes a deterministic optical packet switch. Laser diode transmitter arrays and photodetector arrays are described in the paper [19], entitled "Terabit/Sec VCSEL-Based 48-Channel Optical Module Based on Holey CMOS Transceiver IC", IEEE JLT, 2013.

Figure 10A:
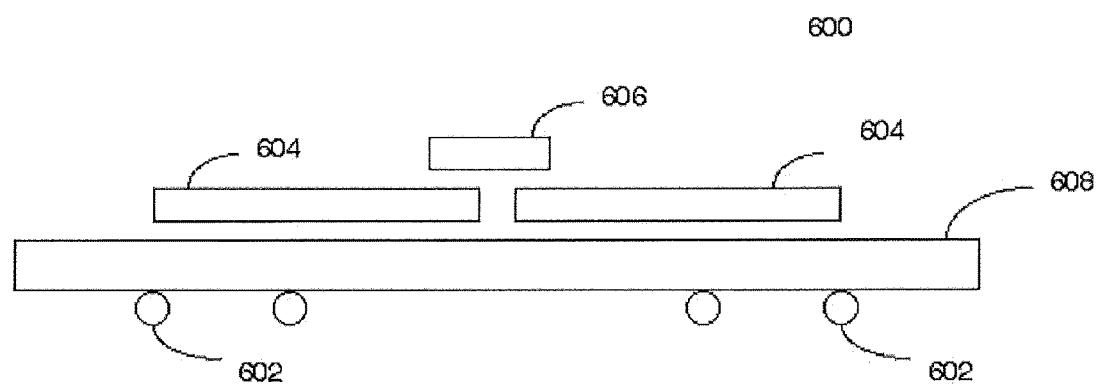
FIG. 10A illustrates an integrated circuit package which can contain an FPGA or ASIC die, interconnected to a Silicon-Photonics transceiver die, using a bridge die.

FIG. 10A illustrates a Ball Grid Array (BGA) integrated circuit package 600 with a main package substrate 608. The package contains lead solder balls 602 which make an electrical connection to a printed circuit board (not shown). The package holds 2 die 604, which are interconnected with a small third die 606, called a bridge die, which acts as an electrical bridge between the 2 die 604. The bridge die 606 may also be placed underneath the die 604, which are held in place with another substrate (not shown). The bridge die 606 can contain hundreds and potentially thousands of high-speed low-power electrical wires. This approach allows for a much higher data-rate to be supported between the die 606, than is possible if each die 604 was packaged on a separate BGA package. The die 604 are interconnected to the BGA package solder balls 602 using existing methods (not shown in FIG. 9A).

Figure 10B:
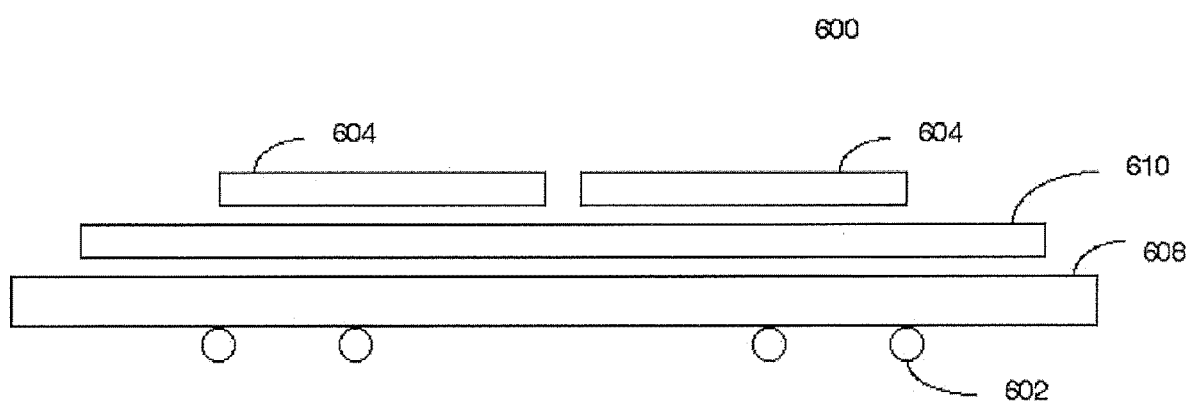
FIG. 10B illustrates an integrated circuit package which can contain an FPGA or ASIC die, interconnected to a Silicon-Photonics transceiver die, using an interposer substrate.

FIG. 10B illustrates another packaging technology which uses an interposer integrated circuit 610. The interposer 610 is a large integrated circuit, which typically has an area sufficient to contain all the die 604 that it interconnects. The interposer 610 can provide a large number high-speed low-power electrical wires between the die 604. The interposer is interconnected to the BGA package solder balls 602 using existing methods (not shown in FIG. 9B).

These technologies create the opportunity to integrate silicon photonics transceiver die, with FPGA or ASIC die, into a single integrated circuit package such as a BGA package. The resulting package could have an optical Input-Output (IO) bandwidth of several Tbps in the near term, and potentially 10 to 50 Tbps of IO bandwidth in the future. The proposed methods and designs disclosed in this document allow for practical reduced-complexity deterministic packet switches, with 10s of Tbps of IO bandwidth, to fit on a single integrated circuit package.

Wireless Networks

The proposed invention can also be applied to switches for wireless networks. The method to remove the need to process packet-headers, and of using deterministic schedules to select an output port of the switch, can also be used in a switch within a wireless router. For example, the CIOQ switch in FIG. 3A or 3C or the CIXOQ switch in FIG. 3B or 3D can be used in a wireless router, in a deterministic wireless network. In FIG. 1, the controller 14 can have memory to store a deterministic periodic schedule, to select the output port and VOQ for each arriving wireless packet. Deterministic wireless networks are described in the US patent [11], entitled "Delay and Jitter Limited Wireless Mesh Network Scheduling", U.S. Pat. No. 8,619,556 B2, Dec. 31, 2013.

Figure 11:
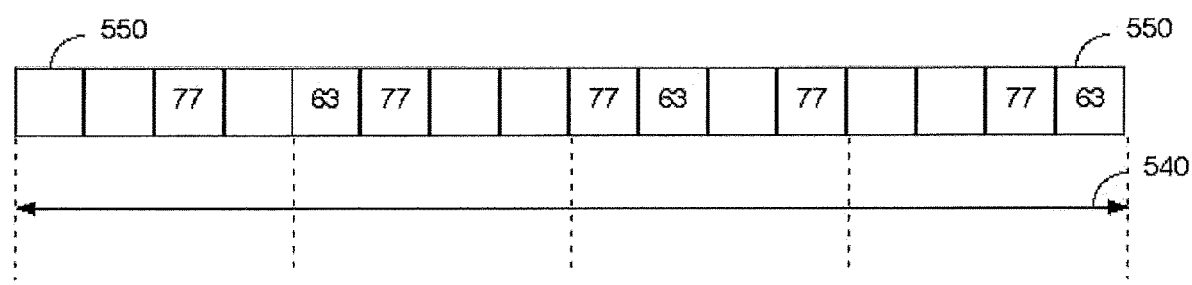
FIG. 11A illustrates a schedule for a queue, which uses a discrete-time model.
FIG. 11B illustrates a schedule for a queue, which uses a continuous-time model.
Figure 11:
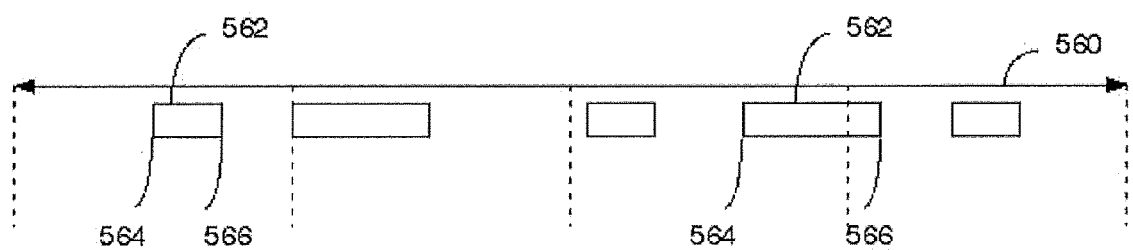

FIG. 11, Low Jitter Schedules

FIG. 11A illustrates a low-jitter schedule. Consider a discrete-time switch, where a scheduling frame has F=1,024 time-slots. (F can be any positive integer. When F is a power of 2, i.e., $2^{10}=1024$ or $2^{14}=16,384$, then the scheduling algorithms may use recursion, which can simplify the computations.) A scheduling frame 540 has a duration of F time-slots. A time-slot is denoted with the label 550. A time-slot may have sufficient duration to allow a packet with about 1500 bytes to be transmitted (or any other number of bytes that the network administrator chooses). Consider a traffic flow with label 77, which requests a Guaranteed-Rate of transmission, corresponding to 5 time-slot reservations per scheduling frame. The 5 time-slots allocated for transmission should ideally be distributed, in a manner to minimize the packet jitter. When the packet jitter is minimized, the size of the buffers to store the packets will also be minimized. The packet jitter can be defined as the variance of the time duration in between packet transmissions. Ideally and in a low-jitter schedule, the number of transmission reservations in each half of the scheduling frame will be relatively equal. Ideally and in a low-jitter schedule, the number of transmission reservations in each quarter of the scheduling frame will be relatively equal. In FIG. 11A, flow 77 receives 2 time-slots of service in the first half of the schedule, and it receives 3 time-slots of service in the second half of the schedule, which is as good as can be. Flow 77 receives 1 time-slot of service in the first, second and fourth quarters of the schedule, and it receives 2 time-slots of service in the third of the quarter schedule, which is also as good as can be.

In general, a flow f with a Guaranteed-Rate equal to R time-slots of reservation per scheduling frame, should receive about R/2 time-slots of reservation in each half of the schedule, and it should receive about R/4 time-slot reservations in each quarter of the schedule. Some small deviations are expected, as the scheduling algorithm has to satisfy several competing demands for service. For example, the number of transmission reservations in each interval of the scheduling frame may differ by a small constant, such as K=1, 2 or 4 time-slot reservations.

Consider a flow f with a Guaranteed-Rate of R time-slots of reservations per scheduling frame. Ideally, the service the flow receives over a fraction of the scheduling-frame comprising time-slots 1 . . . T, for T<=F, will be a pro-rated fraction of its Guaranteed-Rate. For example, if a flow receives R time-slot reservations in a scheduling frame with F time-slots, then it should receive a pro-rated fraction equal to (T/F)*R time-slots of reservation, in the fraction of the scheduling-frame comprising time-slots 1 . . . T, for T<=F. Some small deviations are expected, as the scheduling algorithms have to satisfy several competing demands for service. The amount of service received in a fraction of the scheduling-frame may deviate by a small constant, such as K=1, 2 or 4 time-slot reservations.

The discussion thus far has used a discrete-time model for a packet switch, where a scheduling frame comprises F time-slots of fixed duration. However, the proposed methods and designs also apply to a continuous-time model of a packet switch. FIG. 11B illustrates a continuous-time model, where the duration of the time-slots is not fixed and can vary. A scheduling interval 560 can have a fixed duration of time F can equal 1 microsecond, or 1 millisecond, or some other value. A scheduling algorithm can reserve packet-intervals 562 for the transmission of packets, and these packet-intervals may have variable time durations. The transmission of each packet in a packet-interval has a start-time 564, and an end-time 566, which are determined by the size of the packet. A continuous-time schedule comprises an ordered list of events, and their start-times and end-times. For example, a schedule of transmissions in a scheduling interval can comprise an ordered list of the VOQs to transmit, an ordered list of the Flow-VOQs or Class-VOQs within the VOQs to transmit, and the specification of the start-times and end-times of the packet transmissions within a scheduling interval. A schedule of receptions in a scheduling interval can comprise an ordered list of the VOQs to receive a packet, an ordered list of the Flow-VOQs or Class-VOQs within the VOQs to receive said packet, and the specification of the approximate start-times and end-times of the packet transmissions within a scheduling interval.

A low-jitter schedule for a Guaranteed-rate traffic flow is one where the amount of data transmitted in each half of the scheduling interval for that traffic flow is approximately equal. Similarly, the amount of data transmitted in each quarter of the scheduling interval for that traffic flow is approximately equal.

Consider a flow f with a Guaranteed-Rate of transmission equal to R bytes per scheduling interval. Ideally, the service the flow receives over a fraction of the scheduling interval of duration T, where T<=F, will be a pro-rated fraction of its Guaranteed-Rate. For example, if a flow receives R bytes of transmission reservation in a scheduling interval with duration of F time, then it should receive a pro-rated fraction equal to (T/F)*R bytes of transmission reservation, in the fraction of the scheduling-interval with duration T time, where T<=F. Some small deviations are expected, as the scheduling algorithms have to satisfy several competing demands for service. The amount of service received in a fraction of the scheduling-interval may deviate by a small amount, such as the amount of service equal to R/8 or R/16.

The proposed methods and designs also apply to a continuous-time switch. In this case, a continuous-time schedule comprises an ordered list of packet transmissions, and their start-times and end-times.

Finally, the previous embodiments are intended to be illustrative only and in no way limiting. The described embodiments of carrying out the invention are susceptible to many modifications of form, arrangement of parts, details and order of operation. The invention, rather, is intended to encompass all such modifications within its scope, as defined by the claims.

For example, the buffers and queues in the routers have been described as VOQs, Class-VOQs, and Flow-VOQs. In practice, all these queues may reside in the same memory module, and they may be defined through pointers to memory, and they may exist only as logical abstractions. Similarly, the multiple VOQs in each input port can all reside in the same memory module, and they may be defined through pointers to memory, and they may exist only as logical abstractions. This variation is easily handled with the proposed methods. In another example, the plurality of deterministic schedules for a switch may be stored in one large schedule, or they may be stored in one memory, or they may be stored in smaller memories distributed through the switch. In another example, the disclosure discusses one optical-to-electrical converter per input port, and one electrical-to-optical converter per output port. However, an input port and output port can have a plurality of such converters, to increase the data-rates. Similarly, this disclosure illustrates that each input port may have one VOQ to buffer packets directed to an output port, but an input port may have a plurality of VOQs to buffer packets directed to an output port, to increase data-rates.

What is claimed is:

1. A method of operating a plurality of switches within a packet-switched network that delivers Guaranteed-Rate (GR) traffic flows, each of said plurality of switches comprising:
N input ports;
M output ports;
N×M queues, wherein each of said N input ports is associated with M of said N×M queues and each of said M output ports is associated with N of said N×M queues, and wherein each of said N×M queues buffers data which belongs to those of said GR traffic flows which arrive at a particular one of said N input ports and which depart from a particular one of said M output ports, and wherein each of said N*M queues is associated with a guaranteed data-rate;
a first memory,
said method comprising:
for each switch of said plurality of switches,
determining a first periodic schedule that identifies which of said N×M queues, if any, has reservations to receive and buffer data, for a plurality of time-intervals within a scheduling-interval;
storing said first periodic schedule in said first memory of said switch;
wherein for each queue of said N×M queues, said first periodic schedule reserves a sufficient amount of time for receiving data in said scheduling-interval to meet the guaranteed data-rate requirement of said N×M queue;
and wherein for each queue of said N×M queues, said first periodic schedule reserves a substantially-equal amount of time for receiving data in each half of said scheduling-interval.

2. The method of claim 1, wherein each switch of said plurality of switches further comprises a second memory;
said method further comprising:
for each switch of said plurality of switches,
determining a second periodic schedule that identifies which of said N×M queues, if any, has reservations to transmit data, for a plurality of time-intervals within said scheduling-interval;
storing said second periodic schedule in said second memory of said switch;
wherein for each queue of said N×M queues, said second periodic schedule reserves a sufficient amount of time for transmitting data in said scheduling-interval to meet the guaranteed data-rate requirement of said N×M queue;
and wherein for each queue of said N×M queues, said second periodic schedule reserves a substantially-equal amount of time for transmitting data in each half of said scheduling-interval.

3. The method of claim 2, wherein for each switch of said plurality of switches, said first memory is distributed over the input ports of said switch.

4. The method of claim 2, wherein each of said time-intervals represents a time-slot with a fixed duration of time, and said scheduling-interval represents a scheduling-frame with a fixed number of time-slots.

5. The method of claim 3, wherein each of said time-intervals represents a time-slot with a fixed duration of time, and said scheduling-interval represents a scheduling-frame with a fixed number of time-slots.

6. A deterministic packet switch for switching a plurality of guaranteed-rate (GR) traffic flows over a set of output ports, without processing packet headers, wherein each GR traffic flow is associated with a guaranteed data-rate, comprising:
N input ports, each comprising a data-receiver;
M output ports, each comprising a data-transmitter;
N×M queues, wherein each of said N input ports is associated with M of said N×M queues and each of said M output ports is associated with N of said N×M queues, wherein each of said N×M queues buffers data which belongs to those of said GR traffic flows which arrive at a particular one of said N input ports and which depart from a particular one of said M output ports, and wherein each of said N×M queues is associated with a guaranteed data-rate;
a first memory for storing a first periodic schedule;
a controller operable to receive control packets from a network control-plane;
wherein said first periodic schedule specifies which of said N*M queues, if any, has reservations to receive and buffer data for a plurality of time-intervals in a scheduling-interval;
wherein for each of said N×M queues, said first periodic schedule reserves a sufficient amount of time for receiving data in said scheduling-interval to satisfy the guaranteed data-rate requirement of said N×M queue;
wherein for each of said N×M queues, said first periodic schedule reserves a substantially-equal amount of time for receiving data in each half of said scheduling-interval;
and wherein said controller can configure said first memory with said first periodic schedule.

7. The deterministic packet switch of claim 6, further comprising;
a second memory for storing a second periodic schedule;
wherein said second periodic schedule specifies which of said N*M queues, if any, has reservations to transmit data for a plurality of time-intervals in said scheduling-interval;
and wherein for each of said N×M queues, said second periodic schedule reserves a sufficient amount of time for transmitting data in said scheduling-interval to satisfy the guaranteed data-rate requirement of said N×M queue.

8. The deterministic packet switch of claim 7, wherein for each of said N×M queues, said second periodic schedule reserves a substantially-equal amount of time for transmitting data in each half of said scheduling-interval.

9. The deterministic packet switch of claim 7, wherein for each of said N×M queues, said first periodic schedule reserves a substantially-equal amount of time for receiving data in each quarter of said scheduling-interval, and said second periodic schedule reserves a substantially-equal amount of time for transmitting data in each quarter of said scheduling-interval.

10. The deterministic packet switch of claim 9, wherein said first memory is distributed over the input ports of said switch.

11. The deterministic packet switch of claim 10, wherein said second memory is distributed over several smaller memories throughout said switch.

12. The deterministic packet switch of claim 9, wherein each of said plurality of time-intervals represents a time-slot with a fixed duration of time, and wherein said scheduling-interval represents a scheduling-frame with a fixed number of time-slots.

13. The deterministic packet switch of claim 9, wherein each of said N×M queues comprises a plurality of sub-queues.

14. The deterministic packet switch of claim 13, wherein for each of said N×M queues, each of said plurality of sub-queues is associated with a guaranteed data-rate.

15. The deterministic packet switch of claim 14, wherein at least one of said plurality of sub-queues buffers data which belongs to one GR traffic flow.

16. The deterministic packet switch of claim 14, wherein at least one of said plurality of sub-queues buffers data which belongs to a plurality of GR traffic flows.

17. The deterministic packet switch of claim 16, wherein said plurality of GR traffic flows belong to the same traffic class.

18. The deterministic packet switch of claim 9, further comprising a second controller, wherein said second controller will select data to transmit from a sub-queue using a 'First Come First Served' (FCFS) scheduling policy.

19. The deterministic packet switch of claim 14, further comprising: a third memory for storing a third periodic schedule, wherein said third periodic schedule specifies which of said sub-queues, if any, associated with each of said N×M queues, if any, has reservations to receive data, for a plurality of time-intervals in said scheduling-interval; a fourth memory for storing a fourth periodic schedule, wherein said fourth periodic schedule specifies which of said sub-queues, if any, associated with each of said N×M queues, if any, has reservations to transmit data, for a plurality of time-intervals in said scheduling-interval;

wherein for each of said N×M queues, and for each of said sub-queues associated with said N×M queue, said third periodic schedule reserves for each of said sub-queues a sufficient amount of time for receiving data in said scheduling-interval to meet the guaranteed data-rate requirement of said sub-queue; wherein for each of said N×M queues, and for each of said sub-queues associated with said N×M queue, said fourth periodic schedule reserves a sufficient amount of time for transmitting data in said scheduling-interval to meet the guaranteed data-rate requirement of said sub-queue; and wherein said controller can configure each of said third and fourth memories with its associated schedule.

20. The switch of claim 19, wherein each of said plurality of time-intervals represents a time-slot with a fixed duration of time, and said scheduling-interval represents a scheduling-frame comprising a fixed number of time-slots.

21. The switch of claim 12,
wherein said controller receives from said control-plane a traffic rate matrix with N×M elements, which specify the guaranteed data-rates to be supported by said N×M queues, wherein each guaranteed data-rate is expressed as a number of time-slot reservations per scheduling-frame with F time-slots;
and wherein said controller computes the first periodic schedule and second periodic schedule from said traffic rate matrix.

22. The switch of claim 19,
wherein said controller receives from said control-plane the guaranteed data-rates associated with each of the GR traffic flows which traverse said switch, wherein each guaranteed data-rate is expressed as a number of time-slot reservations per scheduling-frame with F time-slots;
and wherein said controller computes said third periodic schedule and said fourth periodic schedule.

23. The switch of claim 9, packaged into a single integrated circuit package.

24. The switch of claim 23, packaged into a single Ball Grid Array (BGA) package.

25. The switch of claim 23, wherein the integrated circuit package comprises multiple integrated circuit die.

26. The switch of claim 25, wherein each of said N input ports comprises an optical-to-electronic (OE) data-receiver that converts received optical signals to electrical signals, and wherein each output port comprises an electrical-to-optical (EO) data-transmitter that converts received electrical signals to optical signals.

27. The switch of claim 26, wherein said OE data-receivers are realized using the Silicon Photonics technology, and wherein said EO data-transmitters are realized using the Silicon Photonics technology.

28. The switch of claim 9, further comprising a security-controller that monitors data that arrives at each of said N×M queues, and detects the arrival of unauthorized data.

29. The switch of claim 28, wherein unauthorized data arrives at one of said N×M queues at a time-interval for which no arrival has been scheduled in said first periodic schedule for said queue.

30. The switch of claim 28, wherein unauthorized data arrives at one of said N×M queues when the amount of data that arrives for said queue in said scheduling-interval exceeds the amount of data that should arrive for said queue in said scheduling-interval according to the guaranteed data-rate for said queue.

31. The switch of claim 19, further comprising a security-controller that monitors data that arrives, and detects the arrival of unauthorized data.

32. The switch of claim 31, wherein said security-controller monitors data that arrives at each of said sub-queues, and detects the arrival of unauthorized data, and wherein unauthorized data arrives at one of said sub-queues at a time-interval for which no arrival has been scheduled in said third periodic schedule for said sub-queue.

33. The switch of claim 31, wherein said security-controller detects the arrival of unauthorized data which occurs when the amount of data that arrives at one of said sub-queues in said scheduling-interval exceeds the amount of data that should arrive for said sub-queue in said scheduling-interval according to the guaranteed data-rate for said sub-queue.

34. The switch of claim 12, further comprising a security-controller that monitors data that arrives at each of said N×M queues, and detects the arrival of unauthorized data, wherein unauthorized data arrives at one of said N×M queues at a time-slot for which no arrival has been scheduled in said first periodic schedule for said queue.

35. The switch of claim 20, further comprising a security-controller that monitors data that arrives, and detects the arrival of unauthorized data.

36. The switch of claim 35, wherein said security-controller monitors data that arrives at each of said sub-queues, and detects the arrival of unauthorized data, and wherein unauthorized data arrives at one of said sub-queues at a time-slot for which no arrival has been scheduled in said third periodic schedule for that sub-queue.

37. The switch of claim 12, wherein each of said GR traffic flows transmits Internet Protocol (IP) packets;
wherein the reception of a large IP packet may require multiple time-slots, and wherein the transmission of a large IP packet may require multiple time-slots.

38. The switch of claim 37, wherein the reception of a large IP packet may require multiple consecutive time-slots, and wherein the transmission of a large IP packet may require multiple consecutive time-slots.

* * * * *